US012367857B2

(12) United States Patent
Turner et al.

(10) Patent No.: US 12,367,857 B2
(45) Date of Patent: Jul. 22, 2025

(54) REFUSE VEHICLE WITH SOUND MANAGEMENT

(71) Applicant: Oshkosh Corporation, Oshkosh, WI (US)

(72) Inventors: Ross Turner, Oshkosh, WI (US); Jerrod Kappers, Oshkosh, WI (US); Logan Gary, Oshkosh, WI (US); Quincy Witman, Oshkosh, WI (US); Derek Wente, Austin, MN (US); Jason Rice, Oshkosh, WI (US); Jacob Wallin, Oshkosh, WI (US); Emily Davis, Rochester, MN (US); Joshua Rocholl, Rochester, MN (US)

(73) Assignee: Oshkosh Corporation, Oshkosh, WI (US)

( * ) Notice: Subject to any disclaimer, the term of this patent is extended or adjusted under 35 U.S.C. 154(b) by 159 days.

(21) Appl. No.: 17/967,368

(22) Filed: Oct. 17, 2022

(65) Prior Publication Data

US 2023/0120042 A1 Apr. 20, 2023

Related U.S. Application Data

(60) Provisional application No. 63/256,931, filed on Oct. 18, 2021.

(51) Int. Cl.

| | |
|---|---|
| ***G10K 11/178*** | (2006.01) |
| ***B65F 3/02*** | (2006.01) |
| ***B65F 3/06*** | (2006.01) |

(52) U.S. Cl.

CPC .......... *G10K 11/17855* (2018.01); *B65F 3/06* (2013.01); *G10K 11/17857* (2018.01); *B65F 2003/0279* (2013.01); *B65F 2210/168* (2013.01)

(58) Field of Classification Search

CPC ....... G10K 11/17855; G10K 11/17861; G10K 11/17823; G10K 11/17857; G10K 11/17883; G10K 2210/1282; B65F 3/02; B65F 3/06; B65F 2003/0279; B65F 2210/168

USPC .......................................................... 381/71.1

See application file for complete search history.

(56) References Cited

U.S. PATENT DOCUMENTS

| | | | | |
|---|---|---|---|---|
| 2015/0010163 A1* | 1/2015 | Ganeshkumar | ........ | H04R 3/002 381/71.4 |
| 2017/0121108 A1 | 5/2017 | Davis et al. | | |
| 2018/0265289 A1 | 9/2018 | Davis et al. | | |
| 2018/0327183 A1* | 11/2018 | Peek | ....................... | E01H 5/061 |

(Continued)

*Primary Examiner* — Paul Kim
(74) *Attorney, Agent, or Firm* — Foley & Lardner LLP

(57) ABSTRACT

A refuse vehicle includes a body coupled at least one of the frame and the chassis, a battery configured to provide electrical power to a first motor, a vehicle body supported by the chassis and defining a receptacle for storing refuse therein, an electric power take-off system coupled to the vehicle body, the electric power take-off system including a second motor configured to convert electrical power received from the battery into hydraulic power, one or more microphones coupled to the body and configured to detect noise, one or more speakers coupled to the body configured to emit noise reducing sounds, and a controller configured to receive data related to the detected noise from the one or more microphones and cause the one or more speakers to emit the noise reducing sounds in response to the data received from the one or more microphones.

11 Claims, 20 Drawing Sheets

(56) References Cited

U.S. PATENT DOCUMENTS

| | | | |
|---|---|---|---|
| 2019/0091890 | A1 | 3/2019 | Rocholl et al. |
| 2019/0193934 | A1 | 6/2019 | Rocholl et al. |
| 2019/0322321 | A1 | 10/2019 | Schwartz et al. |
| 2020/0262366 | A1 | 8/2020 | Wildgrube et al. |
| 2020/0346547 | A1 | 11/2020 | Rocholl et al. |
| 2020/0346556 | A1 | 11/2020 | Rocholl et al. |
| 2020/0346557 | A1 | 11/2020 | Rocholl et al. |
| 2020/0346657 | A1 | 11/2020 | Clifton et al. |
| 2020/0346854 | A1 | 11/2020 | Rocholl et al. |
| 2020/0346855 | A1 | 11/2020 | Rocholl et al. |
| 2020/0346856 | A1 | 11/2020 | Rocholl et al. |
| 2020/0346857 | A1 | 11/2020 | Rocholl et al. |
| 2020/0346858 | A1 | 11/2020 | Buege et al. |
| 2020/0346859 | A1 | 11/2020 | Buege et al. |
| 2020/0346860 | A1 | 11/2020 | Buege et al. |
| 2020/0346861 | A1 | 11/2020 | Rocholl et al. |
| 2020/0346862 | A1 | 11/2020 | Rocholl et al. |
| 2020/0347659 | A1 | 11/2020 | Rocholl et al. |
| 2020/0347661 | A1 | 11/2020 | Rocholl et al. |
| 2020/0347857 | A1 | 11/2020 | Clifton et al. |
| 2020/0348681 | A1 | 11/2020 | Clifton et al. |
| 2020/0348764 | A1 | 11/2020 | Clifton et al. |
| 2020/0398670 | A1 | 12/2020 | Rocholl et al. |
| 2020/0398695 | A1 | 12/2020 | Rocholl et al. |
| 2020/0398697 | A1 | 12/2020 | Rocholl et al. |
| 2020/0398772 | A1 | 12/2020 | Wildgrube et al. |
| 2020/0398857 | A1 | 12/2020 | Clifton et al. |
| 2020/0399057 | A1 | 12/2020 | Rocholl et al. |
| 2020/0399058 | A1 | 12/2020 | Rocholl et al. |
| 2021/0031611 | A1 | 2/2021 | Yakes et al. |
| 2021/0031612 | A1 | 2/2021 | Yakes et al. |
| 2021/0069934 | A1 | 3/2021 | Rocholl et al. |
| 2021/0221216 | A1 | 7/2021 | Yakes et al. |
| 2021/0229755 | A1 | 7/2021 | Schwartz et al. |
| 2021/0229908 | A1 | 7/2021 | Rocholl et al. |
| 2021/0252995 | A1 | 8/2021 | Rocholl et al. |
| 2021/0316740 | A1 | 10/2021 | Clifton et al. |
| 2021/0316741 | A1 | 10/2021 | Clifton et al. |
| 2021/0323436 | A1 | 10/2021 | Rocholl et al. |
| 2021/0323437 | A1 | 10/2021 | Rocholl et al. |
| 2021/0323438 | A1 | 10/2021 | Rocholl et al. |
| 2021/0323763 | A1 | 10/2021 | Koga et al. |
| 2021/0323764 | A1 | 10/2021 | Koga et al. |
| 2021/0323765 | A1 | 10/2021 | Koga et al. |
| 2021/0324880 | A1 | 10/2021 | Wente et al. |
| 2021/0325529 | A1 | 10/2021 | Koga et al. |
| 2021/0325911 | A1 | 10/2021 | Koga et al. |
| 2021/0326550 | A1 | 10/2021 | Kappers et al. |
| 2021/0327164 | A1 | 10/2021 | Koga et al. |
| 2021/0327170 | A1 | 10/2021 | Rocholl et al. |
| 2021/0327237 | A1 | 10/2021 | Rocholl et al. |
| 2021/0331635 | A1 | 10/2021 | Wildgrube et al. |
| 2021/0331636 | A1 | 10/2021 | Wildgrube et al. |
| 2021/0331637 | A1 | 10/2021 | Wildgrube et al. |
| 2021/0339632 | A1 | 11/2021 | Rocholl et al. |
| 2021/0339648 | A1 | 11/2021 | Koga et al. |
| 2021/0339949 | A1 | 11/2021 | Rocholl et al. |
| 2021/0345062 | A1 | 11/2021 | Koga et al. |
| 2021/0373560 | A1 | 12/2021 | Koga et al. |
| 2021/0396251 | A1 | 12/2021 | Clifton et al. |
| 2022/0009338 | A1 | 1/2022 | Yakes et al. |
| 2022/0033181 | A1 | 2/2022 | Koga et al. |
| 2022/0096884 | A1 | 3/2022 | Koga et al. |
| 2022/0097527 | A1 | 3/2022 | Koga et al. |
| 2022/0097555 | A1 | 3/2022 | Koga et al. |
| 2022/0097556 | A1 | 3/2022 | Koga et al. |
| 2022/0097633 | A1 | 3/2022 | Koga et al. |
| 2022/0097961 | A1 | 3/2022 | Koga et al. |
| 2022/0097962 | A1 | 3/2022 | Koga et al. |
| 2022/0097963 | A1 | 3/2022 | Koga et al. |
| 2022/0097964 | A1 | 3/2022 | Koga et al. |
| 2022/0099723 | A1 | 3/2022 | Koga et al. |
| 2022/0105827 | A1 | 4/2022 | Rocholl et al. |
| 2022/0106114 | A1 | 4/2022 | Buege et al. |
| 2022/0106115 | A1 | 4/2022 | Buege et al. |
| 2022/0118854 | A1 | 4/2022 | Davis et al. |
| 2022/0156474 | A1 | 5/2022 | Kappers et al. |
| 2022/0161854 | A1 | 5/2022 | Mortenson et al. |
| 2022/0161997 | A1 | 5/2022 | Mortenson et al. |
| 2022/0161998 | A1 | 5/2022 | Turner et al. |
| 2022/0169444 | A1 | 6/2022 | Rocholl et al. |
| 2022/0185582 | A1 | 6/2022 | Koga et al. |
| 2022/0219896 | A1 | 7/2022 | Gary et al. |
| 2022/0258965 | A1 | 8/2022 | Kappers et al. |
| 2022/0258967 | A1 | 8/2022 | Kappers et al. |
| 2022/0267090 | A1 | 8/2022 | Rocholl et al. |
| 2022/0307312 | A1 | 9/2022 | Rocholl et al. |
| 2022/0340359 | A1 | 10/2022 | Rocholl et al. |
| 2022/0380123 | A1 | 12/2022 | Buege et al. |
| 2022/0382388 | A1 | 12/2022 | Clifton et al. |
| 2022/0415103 | A1 | 12/2022 | Rocholl et al. |
| 2023/0002152 | A1 | 1/2023 | Koga et al. |
| 2023/0023747 | A1 | 1/2023 | Clifton et al. |

* cited by examiner

REFUSE VEHICLE WITH SOUND MANAGEMENT

CROSS-REFERENCES TO RELATED APPLICATIONS

This application claims the benefit of priority to U.S. Provisional Patent Application No. 63/256,931, filed on Oct. 18, 2021, which is hereby incorporated by reference herein in its entirety for all purposes.

BACKGROUND

Electric refuse vehicles (i.e., battery-powered refuse vehicles) include one or more energy storage elements (e.g., batteries) that supply energy to an electric motor. The electric motor supplies rotational power to the wheels of the refuse vehicle to drive the refuse vehicle. The energy storage elements can also be used to supply energy to vehicle subsystems, like the lift system or the compactor, in addition to the electric motor that serves as the prime mover.

SUMMARY

One exemplary embodiment relates to a refuse vehicle. The refuse vehicle includes a frame, a chassis coupled to the frame and supporting a plurality of wheels, a body coupled at least one of the frame and the chassis, a battery coupled to at least one of the frame and the chassis and configured to provide electrical power to a first motor, wherein rotation of the first motor selectively drives at least one of the plurality of wheels, a vehicle body supported by the chassis and defining a receptacle for storing refuse therein, an electric power take-off system coupled to the vehicle body, the electric power take-off system including a second motor configured to convert electrical power received from the battery into hydraulic power, one or more microphones coupled to the body and configured to detect noise, one or more speakers coupled to the body configured to emit noise reducing sounds, and a controller configured to receive data related to the detected noise from the one or more microphones and cause the one or more speakers to emit the noise reducing sounds in response to the data received from the one or more microphones.

According to various embodiments, the refuse vehicle includes one or more sensors configured to detect operating conditions of at least one of the first motor or the second motor and provide operating condition data to the controller, wherein the controller is configured to adjust the noise reducing sounds emitted by the one or more speakers in response to receiving the operating condition data. According to various embodiments, the operating condition data indicates at least one of a first speed of the first motor and a second speed of the second motor, wherein the controller is configured to increase an amount of noise reducing sounds emitted in response to detecting an increase in the at least one of the first speed and the second speed. According to various embodiments, the refuse vehicle includes an electric power take-off housing at least partially surrounding the second motor, wherein the electric power take-off housing includes a layer of sound insulating material configured to reduce an audible output of the electric power take-off system. According to various embodiments, at least one of the one or more speakers is coupled directly to the electric power take-off housing. According to various embodiments, the layer of sound insulating material is flame resistant. According to various embodiments, the controller is configured to receive location data and estimate a location of the refuse vehicle based on the location data and reduce a speed of the second motor in response to estimating the location of the refuse vehicle is within a predefined geo-fenced area.

Another exemplary embodiment relates to a method of reducing an audible output from an electric vehicle. The method includes providing a refuse vehicle including a first motor configured to drive at least one of a plurality of wheels, a battery coupled to the first motor and configured to provide electrical power to the first motor, and an electric power take-off system including a second motor configured to convert electrical power received from the battery into hydraulic power. The method further includes detecting, by one or more microphones, noise generated by the refuse vehicle, receiving, by a controller, noise data from the one or more microphones, wherein the noise data is indicative of the noise detected by the one or more microphones, generating, by the controller, noise reducing control data in response to receiving the noise data from the one or more microphones, and providing, by the controller, the noise reducing control data to one or more speakers, and emitting, by the one or more speakers, noise reducing sounds in response to receiving the noise reducing control data.

According to various embodiments, the method further includes detecting, by one or more sensors, operating conditions of at least one of the first motor or the second motor, receiving, by the controller, operating condition data indicative of the operating conditions from the one or more sensors, and adjusting, by the controller, the noise reducing sounds emitted by the one or more speakers in response to receiving the operating condition data. According to various embodiments, the operating condition data indicates at least one of a first speed of the first motor and a second speed of the second motor, and increasing, by the controller, an amount of noise reducing sounds emitted from the one or more speakers in response to determining an increase in the first speed of the first motor or an increase in the second speed of the second motor. According to various embodiments, the method further includes providing an electric power take-off housing at least partially surrounding the second motor, wherein the electric power take-off housing includes a layer of sound insulating material configured to reduce the audible output of the electric power take-off system. According to various embodiments, at least one of the one or more speakers is coupled directly to the electric power take-off housing. According to various embodiments, the controller is configured to receive location data and estimate a location of the refuse vehicle based on the location data and reduce a speed of the second motor in response to estimating the location of the refuse vehicle is within a predefined geo-fenced area.

Another exemplary embodiment relates to a refuse vehicle. The refuse vehicle includes a frame, a chassis coupled to the frame and supporting a plurality of wheels, a body coupled to at least one of the frame and the chassis, a battery coupled to at least one of the frame and the chassis and configured to provide electrical power to a first motor, wherein rotation of the first motor selectively drives at least one of the plurality of wheels, a vehicle body supported by the chassis and defining a receptacle for storing refuse therein, and an electric power take-off system coupled to at least one of the frame, the chassis, and the vehicle body, the electric power take-off system including a second motor configured to convert electrical power received from the battery into hydraulic power, and an electric power take-off housing at least partially surrounding the second motor, wherein the electric power take-off housing includes a layer of sound insulating material configured to reduce an audible output of the electric power take-off system.

According to various embodiments, the electric power take-off system further includes an inverter configured to convert DC electrical power received from the battery into AC electrical power for use by the second motor. According to various embodiments, the electric power take-off system further includes a hydraulic pump, wherein the second motor is configured to convert electrical power received from the inverter into hydraulic power to power the hydraulic pump. According to various embodiments, the inverter and the hydraulic pump are positioned within the electric power take-off housing. According to various embodiments, the layer of sound insulating material is flame resistant. According to various embodiments, the refuse vehicle further includes one or more microphones coupled to the body and configured to detect noise, one or more speakers coupled to the body configured to emit noise reducing sounds, and a controller configured to receive data related to the detected noise from the one or more microphones and cause the one or more speakers to emit the noise reducing sounds in response to the data received from the one or more microphones. According to various embodiments, at least one of the one or more speakers is coupled directly to the electric power take-off housing.

The invention is capable of other embodiments and of being carried out in various ways. Alternative exemplary embodiments relate to other features and combinations of features as may be recited herein.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Figure 1:
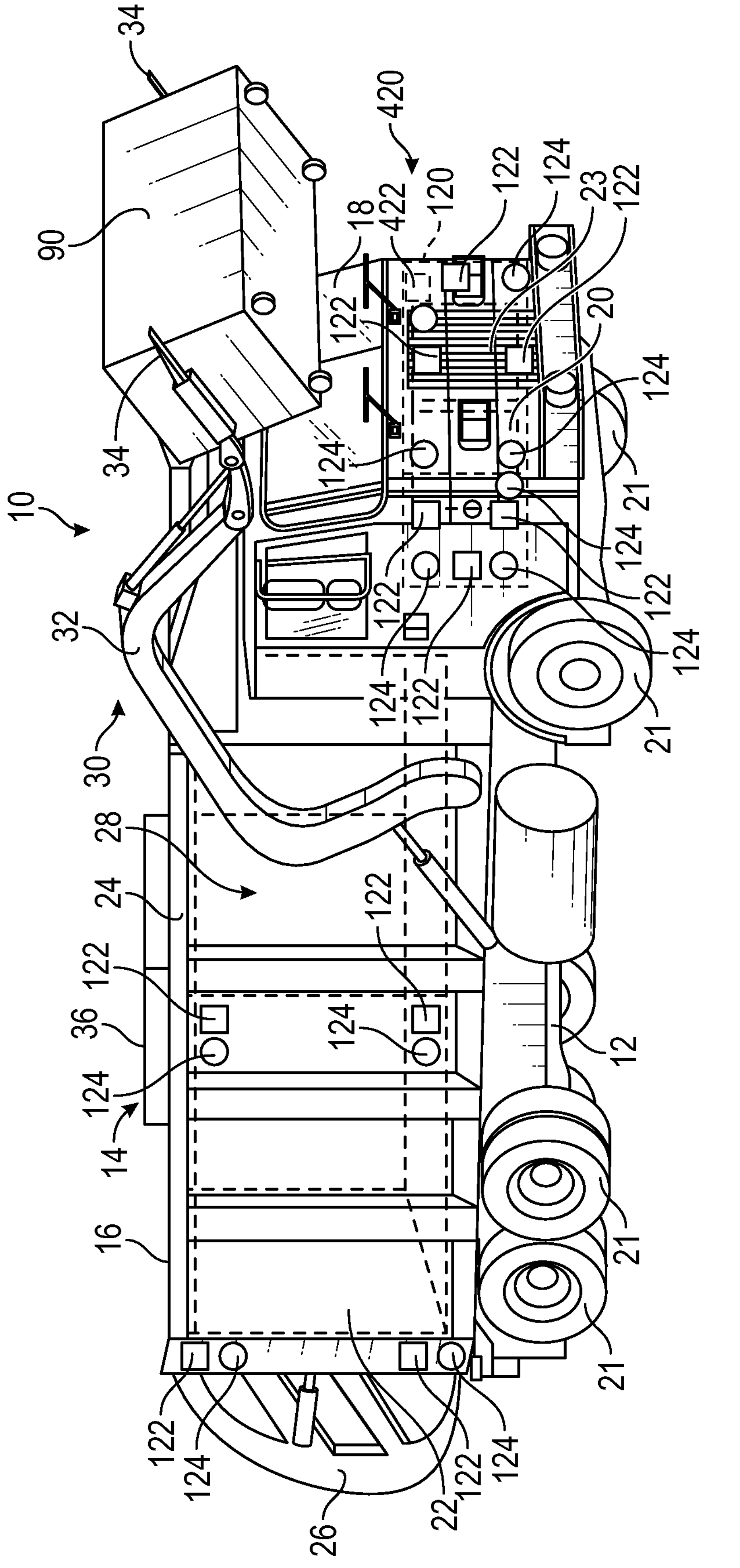
FIG. 1 is a perspective view of a front loading refuse vehicle according to an exemplary embodiment.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Referring to the FIGURES generally, the various exemplary embodiments disclosed herein relate to electric refuse vehicles. Electric refuse vehicles, or E-refuse vehicles, include an onboard energy storage device, such as a battery, that provides power to a motor that produces rotational power to drive the vehicle. The energy storage device, which is commonly a battery or battery assembly, can also be used to provide power to different subsystems on the E-refuse vehicle. The energy storage device is also configured to provide hydraulic power to different subsystems on the E-refuse vehicle through an electric power take-off (E-PTO) system. The E-PTO system receives electrical power from the energy storage device and provides the electrical power to an electric motor. The electric motor drives a hydraulic pump that provides pressurized hydraulic fluid to different vehicle subsystems, including the compactor and the lifting system.

A power distribution unit (PDU) and a controller are used to monitor and control the supply of electrical power from the energy storage device to the electric motor, E-PTO, and auxiliary systems on the vehicle. The controller can communicate with the PDU and/or directly with the battery to selectively request and direct electrical power from the battery to the various systems on the vehicle, including the electric drive motor. The controller is configured to receive data from different sensors on the vehicle body, analyze data received from the sensors, and communicate the analyzed data or instructions based upon the analyzed data to the PDU and/or electric motor to adjust the performance of a vehicle chassis (e.g., adjust the motor, positioning, etc.). The controller can be positioned within either of the body assembly or the chassis and can operate as a central processing unit (CPU) to control a subset or all the functions of the vehicle.

A number of components of the E-PTO system may generate relatively high levels of noise pollution. For example, during operation, the E-PTO motor and the hydraulic pump may generate enough noise to disturb pedestrians (e.g., residents of a neighborhood) and/or loud enough noises to potentially damage the hearing of a nearby person (e.g., an operator of the electric refuse vehicle). Thus, there is a need to reduce the noise pollution emitted by the electric refuse vehicle.

According to various embodiments, the electric refuse vehicle described herein includes an E-PTO housing that at least partially surrounds the E-PTO system. For example, the E-PTO motor, the hydraulic pump, the inverter, and/or the battery may be located within the E-PTO housing. The E-PTO housing may be composed to various parts of the frame, the chassis, and/or the body. The E-PTO housing may include a layer of sound insulation material. For example, the E-PTO housing may include a layer of acoustic foam (e.g., studio foam), sound insulation (e.g., batts made of mineral wool, rock wool, fiberglass, etc.), acoustic panels, acoustic fabrics, acoustic coatings (e.g., Mass Loaded Vinyl), rubber material, composite material, metal, etc.

According to various embodiments, the electric refuse vehicle described herein includes a sound management system configured to reduce a perceived audible output of the electric vehicle (e.g., passive noise cancellation, active noise cancellation, adaptive active noise cancellation, adjustable active noise cancellation, etc.). For example, the electric vehicle refuse vehicle may include one or more sound generation devices (e.g., speakers) configured to output a noise reducing sounds. For example, the speakers may output white noise to mask the sounds output by various components of the electric vehicle. According to various embodiments, the electric refuse vehicle may include one or more noise sensors (e.g., microphones) configured to detect noise output by the electric refuse vehicles. The controller may be communicably coupled to both the sound generation devices and noise sensors such that a feedback control loop is formed to actively reduce the noise output (e.g., active noise cancellation, adaptive active noise cancellation, adjustable active noise cancellation, etc.).

The sound management system may be configured to adjust the sound generation device(s) in response to a detecting a triggering event. For example, the electric refuse vehicle may include one or more sensors configured to detect a speed of the motor and/or the E-PTO motor. In response to determining an increase in speed of the motor and/or the E-PTO motor, the controller may cause the sound generation device(s) to increase audio output. Further, the electric refuse vehicle may include a location device (e.g., a GPS, a cellular transponder, position sensors, etc.). The controller may receive location data from the location device and estimate a position of the refuse vehicle based on the location data. The controller may then adjust the audible output of the sound generation device based on the estimated location. For example, if the controller determines the electric refuse vehicle is within a residential neighborhood, the controller may cause the sound management system to enter active noise cancellation mode and/or increase an audible output from the sound generation device(s). In another example, the controller may shut down sound management system or reduce the audible output of the sound generation devices in response to determining that the electric refuse vehicle is on an interstate highway.

Refuse Truck

Referring to FIGS. 1-4, a vehicle, shown as refuse truck 10 (e.g., garbage truck, waste collection truck, sanitation truck, etc.), includes a chassis, shown as a frame 12, and a body assembly, shown as body 14, coupled to the frame 12. The body assembly 14 defines an on-board receptacle 16 and a cab 18. The cab 18 is coupled to a front end of the frame 12, and includes various components to facilitate operation of the refuse truck 10 by an operator (e.g., a seat, a steering wheel, hydraulic controls, etc.) as well as components that can execute commands automatically to control different subsystems within the vehicle (e.g., computers, controllers, processing units, etc.). The refuse truck 10 further includes a prime mover 20 coupled to the frame 12 at a position beneath the cab 18. The prime mover 20 provides power to a plurality of motive members, shown as wheels 21, and to other systems of the vehicle (e.g., a pneumatic system, a hydraulic system, etc.). In one embodiment, the prime mover 20 includes one or more electric motors coupled to the frame 12. The electric motor(s) may consume electrical power from an on-board energy storage device (e.g., one or more batteries 23, ultra-capacitors, etc.), from an on-board generator (e.g., an internal combustion engine and alternator), and/or from an external power source (e.g., overhead power lines, power rails, etc.) and provide power to the systems of the refuse truck 10. In some examples, the on-board energy storage device is a plurality of rechargeable lithium-ion battery cells.

According to an exemplary embodiment, the refuse truck 10 is configured to transport refuse from various waste receptacles within a municipality to a storage or processing facility (e.g., a landfill, an incineration facility, a recycling facility, etc.). As shown in FIGS. 1-4, the body 14 and on-board receptacle 16, in particular, include a series of panels, shown as panels 22, a cover 24, and a tailgate 26. The panels 22, cover 24, and tailgate 26 define a collection chamber 28 of the on-board receptacle 16. Loose refuse is placed into the collection chamber 28, where it may be thereafter compacted. The collection chamber 28 provides temporary storage for refuse during transport to a waste disposal site or a recycling facility, for example. In some embodiments, at least a portion of the on-board receptacle 16 and collection chamber 28 extend over or in front of the cab 18. According to the embodiment shown in FIGS. 1-4, the on-board receptacle 16 and collection chamber 28 are each positioned behind the cab 18. In some embodiments, the collection chamber 28 includes a hopper volume 52 and a storage volume. Refuse is initially loaded into the hopper volume 52 and thereafter compacted into the storage volume. According to an exemplary embodiment, the hopper volume is positioned between the storage volume and the cab 18 (i.e., refuse is loaded into a position behind the cab 18 and stored in a position further toward the rear of the refuse truck 10). The refuse truck 10 can be arranged as a front-loading refuse vehicle (shown in FIGS. 1 and 3), a side-loading refuse vehicle (shown in FIG. 2), or a rear-loading refuse vehicle (shown in FIG. 4), for example.

Figure 3:
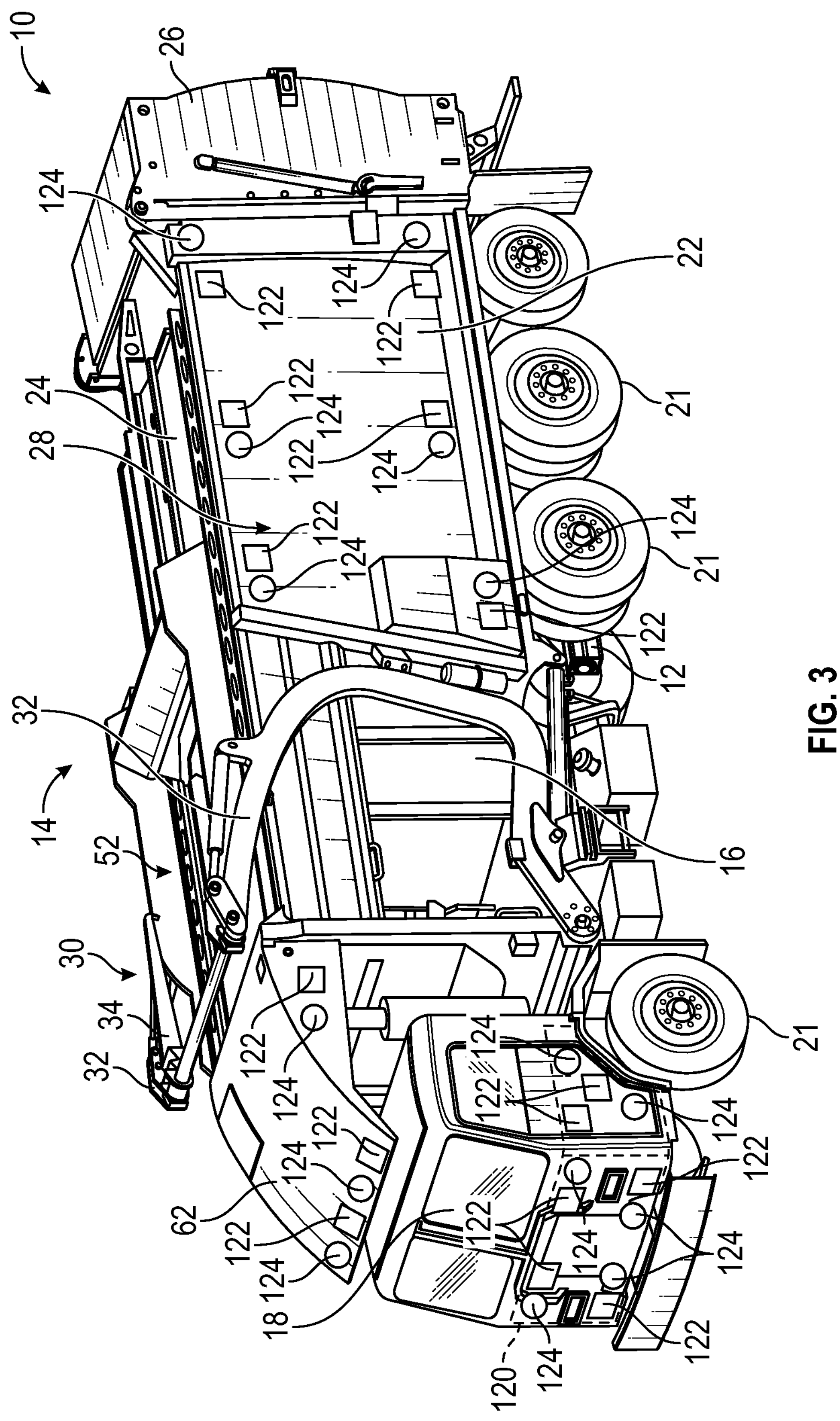
FIG. 3 is a front perspective view of an electric front loading refuse vehicle according to an exemplary embodiment.

Referring again to the exemplary embodiment shown in FIGS. 1 and 3, the refuse truck 10 is a front-loading refuse vehicle. As shown in FIG. 1, the refuse truck 10 includes a lifting system 30 that includes a pair of arms 32 coupled to the frame 12 on either side of the cab 18. The arms 32 may be rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container, etc.). During operation of the refuse truck 10, the forks 34 are positioned to engage the refuse container (e.g., the refuse truck 10 is driven into position until the forks 34 protrude through the apertures within the refuse container). As shown in FIG. 1, the arms 32 are rotated to lift the refuse container over the cab 18. Additional actuators (e.g., a hydraulic cylinder) can articulate the forks 34 to tip the refuse out of the container and into the hopper volume of the collection chamber 28 through an opening in the cover 24. The actuators thereafter rotates the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Figure 2:
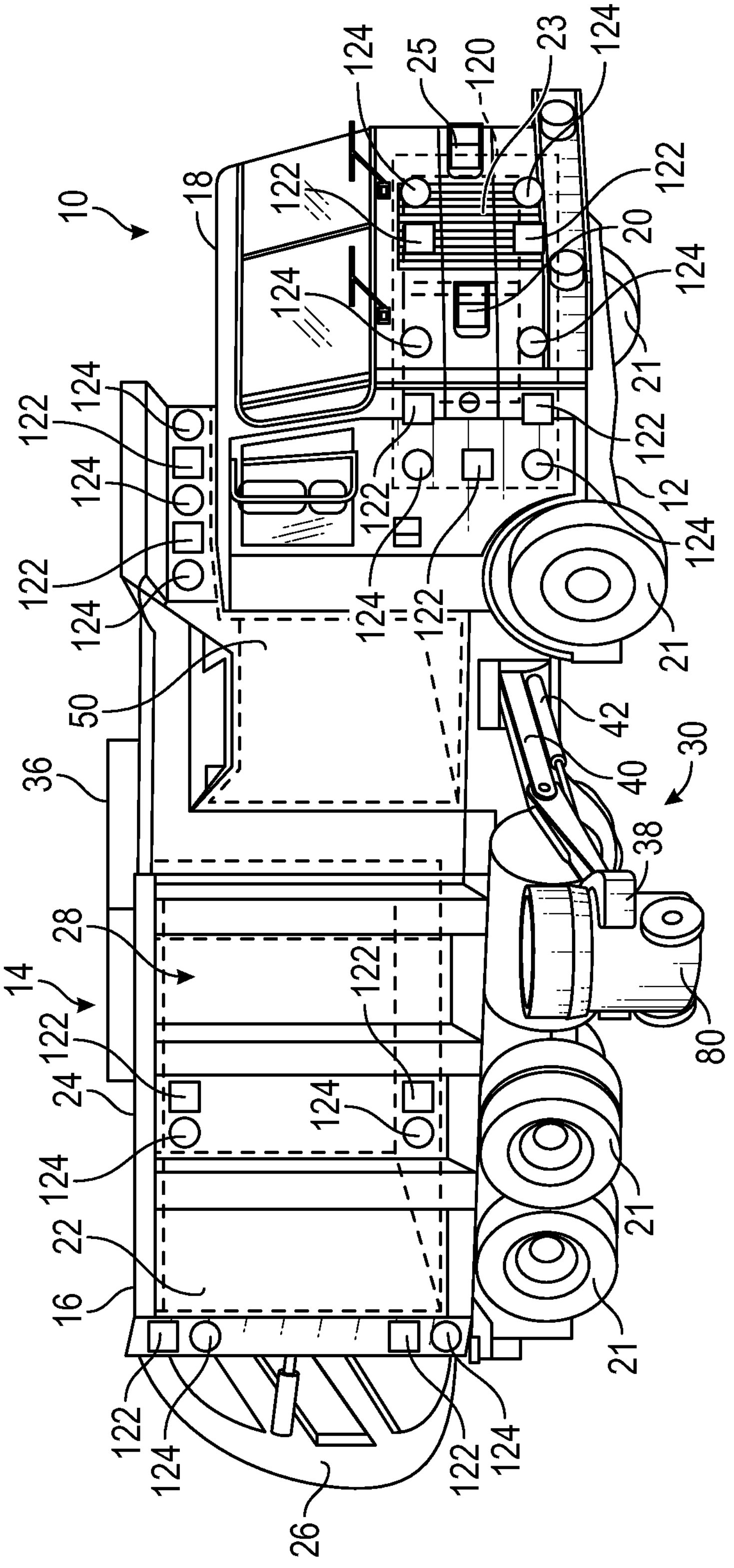
FIG. 2 is a perspective view of a side loading refuse vehicle according to an exemplary embodiment.

Referring to the exemplary embodiment shown in FIG. 2, the refuse truck 10 is a side-loading refuse vehicle that includes a lifting system, shown as a grabber 38 that is configured to interface with (e.g., engage, wrap around, etc.) a refuse container (e.g., a residential garbage can, etc.). According to the exemplary embodiment shown in FIG. 2, the grabber 38 is movably coupled to the body 14 with an arm 40. The arm 40 includes a first end coupled to the body 14 and a second end coupled to the grabber 38. An actuator (e.g., a hydraulic cylinder 42) articulates the arm 40 and positions the grabber 38 to interface with the refuse container. The arm 40 may be movable within one or more directions (e.g., up and down, left and right, in and out, rotation, etc.) to facilitate positioning the grabber 38 to interface with the refuse container. According to an alternative embodiment, the grabber 38 is movably coupled to the body 14 with a track. After interfacing with the refuse container, the grabber 38 is lifted up the track (e.g., with a cable, with a hydraulic cylinder, with a rotational actuator, etc.). The track may include a curved portion at an upper portion of the body 14 so that the grabber 38 and the refuse container are tipped toward the hopper volume of the collection chamber 28. In either embodiment, the grabber 38 and the refuse container are tipped toward the hopper volume of the collection chamber 28 (e.g., with an actuator, etc.). As the grabber 38 is tipped, refuse falls through an opening in the cover 24 and into the hopper volume of the collection chamber 28. The arm 40 or the track then returns the empty refuse container to the ground, and the top door 36 may be slid along the cover 24 to seal the opening thereby preventing refuse from escaping the collection chamber 28 (e.g., due to wind).

Referring to FIG. 3, the refuse truck 10 is a front loading, fully electric E-refuse vehicle. Like the refuse truck 10 shown in FIG. 1, the E-refuse vehicle includes a lifting system 30 that includes a pair of arms 32 coupled to the frame 12 on either side of the cab 18. The arms 32 are rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container, etc.). During operation of the refuse truck 10, the forks 34 are positioned to engage the refuse container (e.g., the refuse truck 10 is driven into position until the forks 34 protrude through the apertures within the refuse container). Additional actuators (e.g., hydraulic cylinders, linear actuators, etc.) articulate the forks 34 to tip the refuse out of the container and into the hopper volume of the collection chamber 28 through an opening in the cover 24. The actuators thereafter rotate the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Still referring to FIG. 3, the refuse truck 10 includes one or more energy storage devices, shown as batteries 23. The batteries 23 can be rechargeable lithium-ion batteries, for example. The batteries 23 are configured to supply electrical power to the prime mover 20, which includes one or more electric motors. The electric motors are coupled to the wheels 21 through a vehicle transmission, such that rotation of the electric motor (e.g., rotation of a drive shaft of the motor 20) rotates a transmission shaft, which in turn rotates the wheels 21 of the vehicle. The batteries 23 can supply electrical power to additional subsystems on the refuse truck 10, including additional electric motors, cab controls (e.g., climate controls, steering, lights, etc.), the lifting system 30, the compactor 50, and/or auxiliary systems 60, for example.

Figure 4:
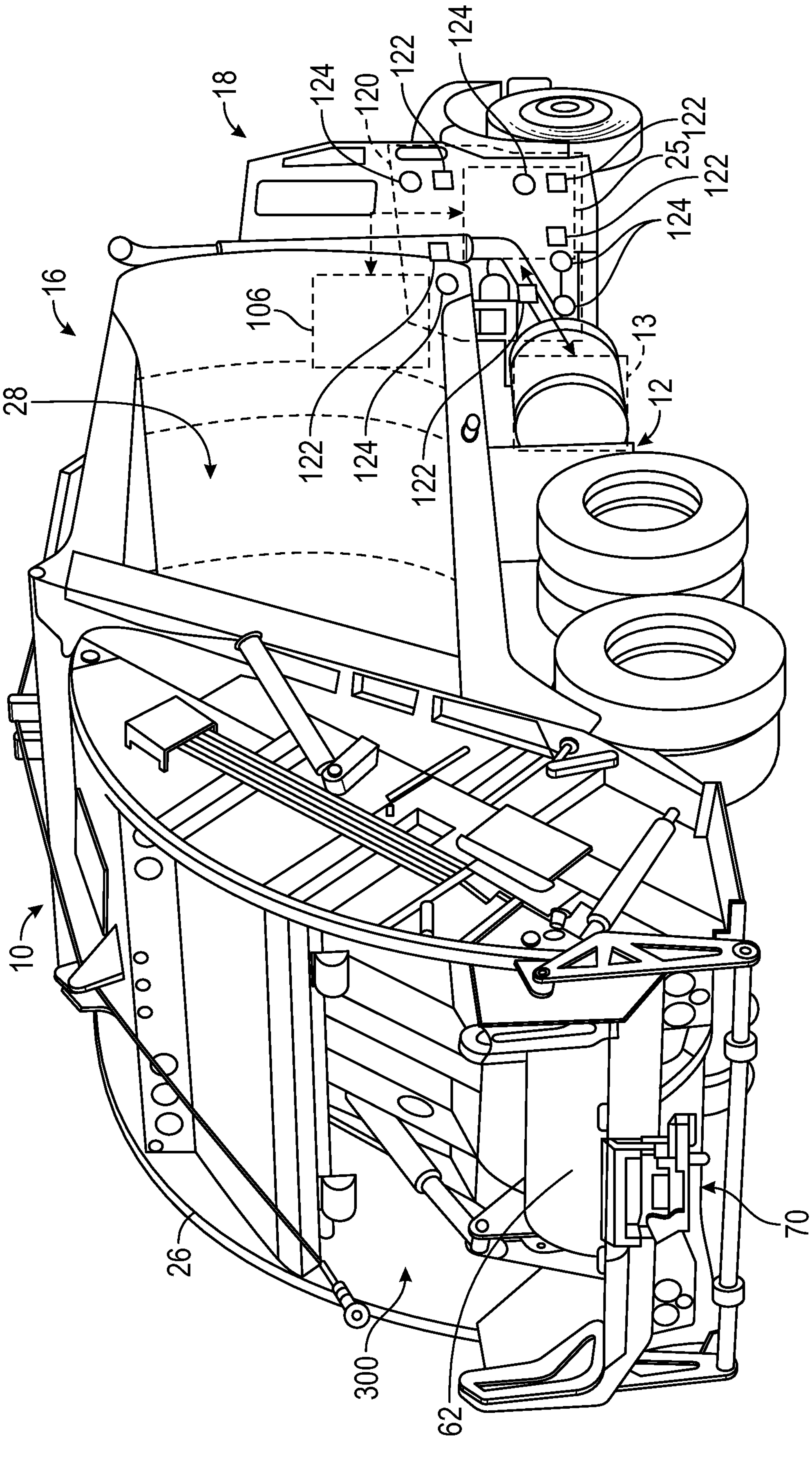
FIG. 4 is a rear perspective view of a rear loading refuse vehicle according to an exemplary embodiment.

Referring to FIG. 4, the refuse truck 10 can be a rear-loading refuse vehicle. Like the refuse truck 10 shown in FIGS. 1-3, the refuse truck 10 includes a frame 12 that supports a body assembly 14 formed of an on-board receptacle 16 and a cab 18. A tailgate 26 is movably positioned at a rear of the on-board receptacle 16 and defines a pathway into the collection chamber 28. In some examples, a refuse can tipper assembly 70 is positioned along the tailgate 26 to help invert refuse cans relative to the ground below so that refuse can be transferred from refuse cans into the tailgate 26. A packer 62 can pull refuse within the tailgate 26 upwardly and inwardly (e.g., forwardly) toward the collection chamber 28 for compaction.

The refuse truck 10 can be a hybrid refuse vehicle or an all-electric refuse vehicle, for example, with an electric frame or chassis 12. In hybrid refuse vehicles, the refuse truck can include both electric and hydraulic power systems. The frame 12 supports a primary battery 23 that is configured to supply electrical power to each of the prime mover 20, shown as an electric motor, and the various systems on the body assembly 14 of the refuse vehicle 10. A power distribution unit (PDU) 25 is in communication with the battery 23 and is configured to selectively monitor and supply electrical power from the battery 23 to each of the body assembly 14 and the prime mover 20. The PDU 25 can be a controller, processor, central processing unit (CPU), or other type of programmable or non-programmable device that monitors the battery 23 and the systems on the body assembly 14 and frame 12 that request electrical power from the battery 23. The PDU 25 is configured to control the supply of electrical power from the battery 23 to accommodate the power requests of the various systems on the frame 12 and body assembly 14 of the refuse truck 10. The PDU 25 monitors the battery 23 and controls contactors within the battery 23 to direct electrical power to the various systems within the refuse truck 10. In some examples, the PDU 25 prioritizes electrical power delivery through the refuse truck 10. The PDU 25 can ensure that critical functions (e.g., the prime mover 20, etc.) receive electrical power before auxiliary systems, like the E-PTO system 100, climate control systems, or radio, for example.

The PDU 25 can control the supply electrical power from the battery 23 to the body assembly 14. In some examples, a disconnect 200 is positioned between the PDU 25 and the body assembly 14 to selectively disable electrical power transmission from the battery 23 to the body assembly 14. The disconnect 200 provides selective electrical communication between the batteries 23 and the body assembly 14 that can allow the secondary vehicle systems (e.g., the lift system, compactor, etc.) to be decoupled and de-energized from the electrical power source. The disconnect 200 can create an open circuit between the batteries 23 and the body assembly 14, such that no electricity is supplied from the batteries 23 to the various systems on the vehicle 10. The refuse truck 10 can then be operated in a lower power consumption mode, given the reduced electrical load required from the batteries 23 to operate the refuse truck 10. The disconnect 200 further enables the refuse truck 10 to conserve energy when the vehicle subsystems are not needed, and can also be used to lock out the various vehicle subsystems to perform maintenance activities. The disconnect 200 further allows an all-electric vehicle chassis to be retrofit with hydraulic power systems, which can be advantageous for a variety of reasons, as hydraulic power systems may be more responsive and durable than fully electric systems.

The refuse vehicle 10 further includes an E-PTO housing 120 that at least partially encompasses part of the E-PTO system 100 that is discussed further below. As shown, the E-PTO housing 120 is located proximate the front of the refuse vehicle 10, however, according to various embodiments, the E-PTO housing 120 may be located elsewhere. For example, if the E-PTO system 100 is located proximate the rear of the refuse vehicle 10, the E-PTO housing 120 may also be located proximate the rear of the refuse vehicle 10. The E-PTO housing 120 may be defined or partially defined by the frame 12, the body 14, and/or any other components of the refuse vehicle 10. In other words, the E-PTO housing 120 is not necessarily a standalone structure positioned within the refuse vehicle 10, but rather is defined, or partially defined, by the structure of the refuse vehicle 10 that encompasses some or all of the E-PTO system 100.

According to various embodiments, the E-PTO housing 120 includes a layer of sound insulating material (e.g., a layer of acoustic foam (e.g., studio foam), sound insulation (e.g., batts made of mineral wool, rock wool, fiberglass, etc.), acoustic panels, acoustic fabrics, acoustic coatings (e.g., Mass Loaded Vinyl), rubber material, composite material, metal, etc.). For example, some or all of the E-PTO housing 120 includes a layer of sound insulating material. The sound insulating material is configured to reduce a perceived audible output from the E-PTO system 100. For example, according to various embodiments, the E-PTO housing 120 encompasses the hydraulic pump 104 and the electric motor 102 of the E-PTO system 100. The hydraulic pump 104 and the electric motor 102 may produce high levels of noise pollution when in use. The sound insulation material may reduce the amount of noise pollution emitted from the E-PTO system 100 by absorbing some of the sound. Further, according to various embodiments, the sound insulating material may be flame resistant, thereby reducing the risk of fire within the E-PTO housing 120.

As shown, the refuse vehicle 10 further includes one or more noise meters 122 (e.g., noise sensors, microphones, etc.) and one or more sound generation devices 124 (e.g., speakers). The noise meters 122 and the sound generation devices 124 may be positioned anywhere about the refuse vehicle 10. For example, as shown, a plurality of noise meters 122 and sound generation devices 124 are positioned proximate (e.g., coupled to, adjacent to, etc.) the E-PTO housing 120. Further, additional noise meters 122 and sound generation devices 124 may be positioned about the remainder of the refuse vehicle 10. As will be discussed further below, the noise meters 122 and sound generation devices 124 may be a part of a sound management system 420, which is configured to reduce a perceived audible output of the refuse vehicle 10.

E-PTO System

Figure 5:
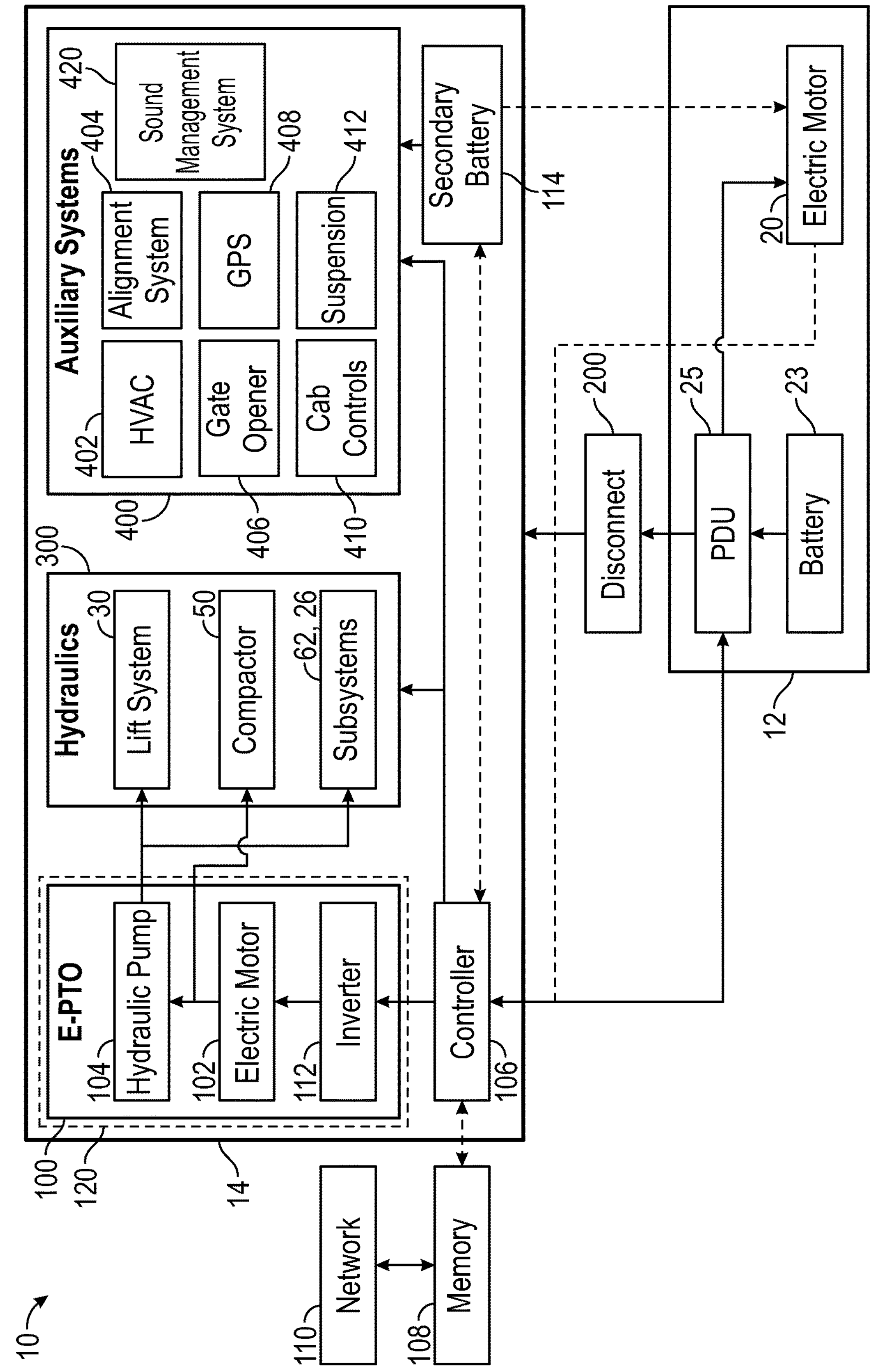
FIG. 5 is a schematic view of a control system that can be incorporated into the refuse vehicle of any of FIGS. 1-4.

The body assembly 14 generally includes an E-PTO system 100, hydraulics 300, and auxiliary systems 400 that are in communication with a central controller 106. The central controller communicates with the PDU 25 to issue electrical power requests that can then be processed and/or otherwise handled by the PDU 25 to transmit electrical power from the battery 23 through to the body assembly 14 and to the systems to be powered. As depicted in FIG. 5, the controller 106 is in communication with a memory 108 (e.g., a cloud-based memory, an archive, a database, onboard memory, etc.) that can supply a variety of different control parameters and information to execute different vehicle functions. In some examples, the memory 108 is in communication with a network 110 (e.g., the internet, a fleet management system, etc.) that provides information to the memory 108 for use by the refuse truck 10. For example, route-based data or past performance data can be provided to the refuse truck 10 through the network 110 and/or the memory 108 to the controller 106.

The controller 106 can distribute electrical power received from the battery 23 and PDU 25 to the various different systems on the refuse truck 10, including an E-PTO system 100, hydraulics 300, and various auxiliary systems 400. The E-PTO system 100, for example, is configured to receive electrical power from the batteries 23 and convert the electrical power to hydraulic power. In some examples, the E-PTO system 100 includes an electric motor 102 driving a hydraulic pump 104. The hydraulic pump 104 pressurizes hydraulic fluid onboard the refuse truck 10, which can then be supplied to various hydraulic cylinders and actuators present upon the body assembly 14 of the refuse truck 10. For example, the hydraulic pump 104 can provide pressurized hydraulic fluid to each of the hydraulic cylinders within the lift system 30 on the refuse truck. Additionally or alternatively, the hydraulic pump 104 can provide pressurized hydraulic fluid to a hydraulic cylinder controlling the compactor 50 or packer 62. In some embodiments, the hydraulic pump 104 also provides pressurized hydraulic fluid to the hydraulic cylinders that control a position and orientation of the tailgate 26, which is movable to empty the vehicle 10 of refuse. The hydraulic pump 104 can be a swashplate-type variable displacement pump, for example, that supplies all the hydraulics 300 upon the refuse truck 10. The hydraulics 300 can be in communication with the controller 106, which can communicate with the electric motor 102 and hydraulic pump 104 to deliver the desired hydraulic loads. Simultaneously, the controller 106 can communicate with the PDU 25 to request the necessary battery power load to drive the electric motor 102 to supply pressurized fluid to the hydraulics 300. In some examples, the controller 106 provides electrical power from the battery 23 to an inverter 112, which can convert DC power from the battery 23 (and from the PDU 25) to AC power for use by the electric motor 102. In some examples, the inverter 112 can be used to vary the frequency of the transformed AC power to adjust the performance of the electric motor 102. In some examples, the inverter 112 can be used to convert electrical power from the battery 23 into AC power for use by the electric motor 20 as well. In some examples, each of the chassis 12 and the body 14 include separate inverters 112 that can be used to supply AC electrical power to components on the chassis 12 and body 14, respectively. The frequency output of the inverter 112 can be adjusted by the controller 106 and/or a variable frequency drive.

The controller 106 at least partially controls the pump 102 and electric motor 104 to deliver pressurized hydraulic fluid to accommodate variable pump loads that may be requested by the hydraulics 300 during normal refuse truck 10 operation. The controller 106 receives signals from various inputs throughout the refuse truck 10 and can subsequently control different components within the body assembly 14 hydraulic circuit to execute different tasks. For example, the controller 106 may receive an input from one or more buttons within the cab 18 of the refuse truck 10 that prompt the lifting system 30 to move in order to raise and empty the contents of a waste receptacle into the on-board receptacle 16 of the refuse truck 10. Upon receiving an input requesting an adjustment of the pump load (e.g., requested movement of the lifting system 30), the controller 106 can activate or adjust an output of the electric motor 102 and pump 104 to deliver pressurized hydraulic fluid from a hydraulic fluid reservoir to the one or more actuators forming the pump load to carry out the requested operation. As depicted in FIG. 5, the controller 106 can work with the hydraulic pump 104 to supply hydraulic fluid to one or more of the lift system 30, the compactor 50, and the various other subsystems upon the body assembly 14 (e.g., the tailgate 26, the packer 62, etc.).

The controller 106 is also in communication with various auxiliary systems 400 on the vehicle body 14 and/or on the frame 12. For example, the controller 106 may communicate with and/or control the operation of the HVAC system 402, a can alignment system 404, a gate opener assembly 406, a global positioning system (GPS) 408, cab controls 410, the vehicle suspension 412, a sound management system 420 and other subsystems present upon the refuse truck 10. The controller 106 can provide communication between the auxiliary systems 400 and the PDU 25, and can selectively permit the transmission of electrical power from the battery 23 to the auxiliary systems 400 on the refuse truck 10. In some examples, the body assembly 14 further supports a secondary battery 114. The secondary battery 114 can be configured to power the controller 106 and/or other subsystems on the body assembly 14, including the E-PTO system 100 and the auxiliary systems 400. In some embodiments, the secondary battery 114 is placed in selective communication with the prime mover 20 to provide a backup ignition or drive source if the primary battery 23 becomes disabled or runs low on power.

As discussed above, the refuse vehicle 10 includes an E-PTO housing 120. According to various embodiments, the E-PTO housing 120 encompasses or partially encompasses one or more components of the E-PTO system 100. For example, the E-PTO housing may encompass the hydraulic pump 104, the electric motor, the inverter, the controller 106, and/or any other components of the E-PTO system 100 and/or the refuse vehicle 10.

Can Alignment Systems

The control schematic and architecture shown in FIG. 5 can be used to execute a variety of different vehicle functions and modes within the refuse truck 10. For example, and as demonstrated in FIG. 5, the refuse truck 10 can include a can alignment system 404. The can alignment system 404 can include one or more sensors positioned about the body assembly 14, including at or near the lift system 30. The sensors monitor a position of a nearby can (e.g., a toter 80, a residential refuse container, a dumpster 90, etc.) and communicate with the controller 106. The sensors and controller 106 can together identify movements that can be made by one or both of the body assembly 14 and frame 12 to achieve proper alignment with the can so that the can will be successfully engaged by the lift system 30 to execute a waste removal process.

The controller 106 is configured to communicate with both of the lift system 30 and the prime mover 20 to execute the steps necessary to achieve proper alignment relative to the can. By knowing (e.g., through communication with the memory 108 and/or the network 110) the amount of permissible movement of the lift system 30 in each direction (e.g., vertically, horizontally, laterally), the controller 106 can first determine whether the current position of the refuse truck 10 relative to the can is within the range of allowable movement of the lift system 30. If the can alignment system 404 determines that the refuse truck 10 is positioned relative to the can within the range of permissible lift system 30 movement relative to the refuse truck 10, the controller 106 sends a command to the E-PTO system 100 and the lift system 30 to engage the can. The controller 106 adjusts a position of the lift system 30 relative to the body assembly 14, engages the can, and inverts the can so that refuse or other waste within the can will be emptied into the on-board receptacle 16 for transport. The lift system 30 can then lower and disengage the can so that the refuse truck 10 can drive to a next location along a route.

If the can alignment system 404 determines that the refuse truck 10 is positioned relative to the can outside of the range of permissible lift system 30 movement relative to the refuse truck 10, the controller 106 can initiate a command to the frame (e.g., through the PDU 25 and to the prime mover 20) to drive the refuse truck 10 to a position within the permissible range. Using the positioning acquired by the sensors within the can alignment system 404, the controller 106 can issue directional data that can then be implemented by the PDU 25, battery 23, and prime mover 20 to move the vehicle to a desired location relative to the can. The controller 106 can communicate both desired direction and magnitude of the adjustment needed so that the distance between the refuse truck 10 and the can is reduced to a point where the can is located within the range of permissible lift system 30 movement relative to the refuse truck 10. Accordingly, the controller 106 can further control a steering system to help execute the alignment process. The steering system can be considered a component of both the frame 12 and the body assembly 14. This process can be particularly useful on both front-end loading and side-loading refuse trucks (e.g., the refuse trucks shown in FIGS. 1-3), as automating a portion of the can engagement and disengagement process can reduce labor costs associated with moving heavy cans into alignment with the refuse truck manually.

In some examples, the can alignment system 404 includes one or more lasers that can help a driver and/or the controller 106 execute a waste removal process from a can, such as the dumpster 90. The can alignment system 404 includes lasers that are mounted onto or near the forks 34. The lasers project light forward to provide a visual indication that corresponds with a current position and/or orientation of the forks 34. The visual indication 34 can be used by a worker (e.g., the driver of the refuse truck 10) to help guide the refuse truck 10 so that the forks 34 are properly positioned relative to the can for engagement.

In some examples, the can alignment system 404 further includes an imaging apparatus and one or more can locating sensors. The can locating sensors can be positioned upon the forks 34 or upon the body assembly 14 (e.g., on the cab 18) to both identify and illuminate cans that are located near the refuse truck 10. In some examples, the can locating sensors communicate with additional target lasers on the refuse truck 10 to illuminate the can "lift points" that correspond with a desired fork location that will successfully raise the can to execute a waste removal process. The target lasers are rotatably coupled to the body assembly 14 and can move through a wide range of angles relative to the refuse truck 10 to illuminate a can within a field of view that extends forward of the refuse truck 10 (in the case of a front end-loading refuse truck) or laterally outward from the refuse truck 10 (in the case of a side-loading refuse truck). The imaging apparatus within the can alignment system 404 can then capture an image of the laser light generated by each of the target lasers and the lasers mounted to the forks 34 of the vehicle. The imaging apparatus can then, in communication with the controller 106 and/or the memory 108 and network 110, calculate the distance and necessary correction to locate the forks 34 within the areas defined by the target lasers. The controller 106 can then communicate these "corrections" to the PDU 25, prime mover 20, steering system, and lift system 30 so that the calculated corrective action can be executed. Once again, the controller 106 can prioritize the order of operation such that if movement of the lift system 30 alone will correct the error, the controller 106 commands the lift system 30 alone to address the error. If misalignment outside of the degree of allowable movement of the lift system 30 is detected, the control instructions can be communicated to the PDU 25, prime mover 20, and steering system until the refuse truck 10 is determined to be within an allowable range of movement so that the lift system 30 can execute the refuse removal process from the can.

Location-Based Operation

The refuse truck 10 is also configured to execute a variety of different location-based and condition-based processes that can link data received or generated by the body assembly 14 to the prime mover 20 and battery 23 to help perform different refuse truck 10 functions. For example, the refuse truck 10 can include a GPS 408 that is positioned within the cab 18 or elsewhere upon the body assembly 14 to monitor a current location of the refuse truck. The GPS 408 communicates with the controller 106 which can, based upon the detected location of the refuse truck 10, modify vehicle performance by activating, deactivating, or optimizing different vehicle subsystems. The controller 106 communicates with the memory 108 and/or the network 110 to access information in real-time corresponding to desired performance characteristics associated with a location of the vehicle. Similarly, the refuse truck 10 (and GPS 408) can include a series of condition sensors that are configured to detect one or more of weather conditions, traffic conditions, roadway conditions, and/or other collectable data along a route. The refuse truck 10 can once again communicate the data from the GPS 408 and associated sensors to the controller 106, which can then execute a series of commands that modify the amount or distribution of electrical power sent from the battery 23 to the body assembly 14 to control the refuse truck 10.

For example, the GPS 408 can work with the controller 106 (and memory 108 and/or network 110) to recognize a variety of different geo-fences that are established for the refuse truck 10. The geo-fences can correspond to different locations along a route that might require or desire different vehicle performance measures. For example, if the refuse truck 10 transitions onto a highway, the associated geo-fence might limit or discontinue power transmission to the E-PTO 100 so that a larger amount of electrical power from the battery 23 is available for use by the prime mover 20 to drive the refuse truck 10 at higher speeds. Another geo-fence can correspond to a dump or refuse collection site. The GPS 408 can communicate with the controller 106 and PDU 25 to control operation of the prime mover 20 and the associated steering system to transition the refuse truck 10 to an autonomous or semi-autonomous mode of operation. The controller 106 can then provide instructions to the E-PTO system 100, hydraulics 300, and auxiliary systems 400 to execute a refuse truck ejection cycle to remove refuse from the on-board receptacle 16. In some examples, the controller 106 also monitors the direction of travel of the refuse truck 10 as it passes through a geo-fence. For example, if the controller 106 detects or receives an indication that the refuse truck 10 has passed a geo-fence traveling in reverse, the controller 106 can transition the vehicle to semi-autonomous or fully-autonomous mode to complete the load ejection process. The controller 106 can control each of the prime mover 20, steering system, E-PTO 100, and hydraulics 300 to automatically execute the load ejection process. If the controller 106 detects or receives an indication that the refuse truck 10 has passed a geo-fence traveling forward, the controller 106 may wait until the controller 106 detects the refuse truck 10 traveling in reverse before transitioning the vehicle to semi-autonomous or fully-autonomous mode.

Other parameters of the refuse truck 10 may be adjusted based upon geo-fencing as well. For example, detected vehicle location (e.g., by the GPS 408) can be cross-referenced or supplemented with information from the memory 108 and/or the network 110 to provide different performance parameters based upon the location of the truck 10. In some examples, the memory 108 stores optimized or pre-programmed performance parameters related to the prime mover 20 or the vehicle suspension 412 (e.g., the frame 12) that can be adjusted based on the detected location of the refuse truck. In some examples, the controller 106 can limit one or more of the prime mover 20 or overall vehicle speed, the available torque to drive the prime mover 20, and/or the permissible acceleration rate of the refuse truck 10 based upon the current location of the truck 10 detected by the GPS 408.

In some examples, the GPS 408 and controller 106 work together to vary the operation of the on-board compactor 50 within the vehicle hydraulics 300. If the refuse truck 10 is performing a collection route, the collection route information may be stored within the memory 108 or is otherwise accessible through the network 110. The controller 106 can analyze the current position of the refuse truck 10 (as provided by the GPS 408) and determine a distance to the next pick-up location along the route. If the determined distance to the next pick-up location exceeds a threshold amount (e.g., 0.5 miles, 1 mile, 2 miles, 5 miles, etc.), the controller 106 can control the E-PTO system 100 to operate the compactor 50. As long as the next pick-up location exceeds the threshold amount, the compactor 50 can remain in the fully-extended position to compact refuse within the on-board receptacle 16. Once the determined distance of the refuse truck 10 to the next pick-up location falls below the threshold amount, the compactor 50 can retract so that the on-board receptacle 16 is positioned to receive more refuse. By maintaining the compactor 50 in the fully-extended position longer and smartly controlling the positioning of the compactor 50, the packing density within the on-board receptacle 16 can be improved. Improved packing density within the refuse truck allows the refuse truck to perform longer routes that include more stops, which can provide additional revenue.

The GPS 408 and data received by the GPS 408 can also be communicated externally from the refuse truck 10. For example, the controller 106 can receive positioning data from the refuse truck 10 that corresponds to a current location. The controller 106 can communicate the current position (or the current position and a future planned route) for the refuse truck 10 to a collection vehicle. The collection vehicle can then travel to meet the refuse truck 10, and can then communicate with the controller 106 to execute a transfer of some or all of the refuse within the refuse truck into the collection vehicle so that refuse can be hauled to an off-site location. Using an intermediate collection vehicle can help the refuse truck 10 save a significant amount of energy by avoiding on-highway trips to collection sites that can take several minutes to perform. By avoiding on-highway trips, the refuse trucks 10 can be designed with smaller and less-expensive prime mover 20 motors, since high power consuming highway travel speed situations are avoided.

As indicated above, the GPS 408 can also include other types of sensors to associate additional condition-based data with location-based data. For example, the GPS 408 can include weather sensors that monitor the weather conditions outside the refuse truck 10. If the weather sensors detect severe weather, the GPS 408 can report severe weather to the controller 106, which can in turn limit or otherwise restrict the functionality of the prime mover 20. Temperatures above or below set temperature thresholds may also impact the performance of the refuse truck 10. For example, if the GPS 408 and associated sensors determine that the ambient temperature is below a threshold temperature (e.g., below 0 degrees C.), the controller 106 can limit the functionality of certain auxiliary systems 400, as the expected electrical load of the HVAC 402 is much higher. Similar processes can be carried out if the ambient temperature exceeds a threshold level (e.g., above 30 degrees C.). Accordingly, the refuse truck 10 can adjust the vehicle performance and energy consumption based on detected weather conditions.

The GPS 408 can also include road quality sensors. For example, vibrational sensors or imaging devices can be positioned along the body assembly 14 or on the frame 12 to monitor the refuse truck 10 as it traverses a route. If one of the sensors detects a pothole or other roadway defect, for example, the GPS 408 can attribute location-based data with the detected pothole. The positioning and severity of the pothole or road defect can be stored within the memory 108 and sent to the network 110. In some examples, the roadway defect data can be used to influence performance characteristics of the refuse truck 10 as it performs a route that is known to include roadway defects. For example, the controller 106 can adjust the suspension 412 of the frame 12 to provide additional dampening because rougher roadways are expected. The suspension 412 can also be adjusted so that the body assembly 14 sits higher above the wheels 21 to further limit or prevent any unwanted contact between the body assembly 14 and the ground below. In some examples, the data associated with roadway defects and location can be useful to third parties as well. Accordingly, this data can be stored on the network 110 or within the memory 108 and provided or licensed to cities or municipalities to alert transportation departments of deteriorating roadway conditions.

The GPS 408 and controller 106 can also be used to help the refuse truck 10 execute a variety of different route planning and route performance processes. In some examples, refuse collection routes are planned in advance. The refuse collection routes include a series of different stops and travel directions to each location along the route, which can be stored within the memory 108 or network 110. Based upon the number of stops and expected duration of the route, the controller 106 can first calculate the amount or potential need for a range extender (e.g., a fuel-powered turbine generator configured to supply auxiliary electrical power to the prime mover 20). The controller 106 can suggest a recommended amount of auxiliary fuel to be stored on the vehicle. Reducing the amount of fuel stored onboard the vehicle by calculating the potential need for auxiliary power based on route characteristics can further limit the total energy consumption from the battery 23 used to power the refuse truck 10. Reviewing and optimizing routes before performance can also allow the use of smaller range extenders.

The stored routes can include a variety of different generated geo-fences along the way that can be used to adjust vehicle performance during the performance of a route. For example, a geo-fence can identify that the refuse truck 10 is traveling through a residential area, and that noise is preferably limited. Accordingly, the controller 106 can control an on-board auxiliary power unit (APU) to power off when the vehicle is traveling within noise-sensitive areas, as the engine within the APU may otherwise generate a significant amount of noise. In routes where the refuse truck 10 expects to need auxiliary power from the route extender (e.g., the APU), the controller 106 can communicate with the GPS 408 and the APU to operate the prime mover 20 with auxiliary power during periods of highway travel or travel through industrial areas, but can switch (e.g., via communication with the PDU 25) power sources to supply battery power from the battery 23 when the GPS 408 detects that the refuse truck 10 is within a more noise-sensitive area.

The stored collection routes can also use the GPS 408 and controller 106 to adjust the vehicle suspension 412 along the route to accommodate different travel conditions. The GPS 408 can use the condition-monitoring sensors as well as historical data from the memory 108 to generate geo-fences to control the suspension 412 of the refuse truck 10 and to react to real-time conditions. The suspension 412 can include several axles (e.g., tag axles, tandem axles, auxiliary axles) that are designed to help the refuse truck 10 distribute loading during the collection process as more refuse is loaded into the on-board receptacle 16. Based upon stored or detected data received by the GPS 408 and associated sensors, the various axles within the suspension 412 can be controlled. For example, auxiliary axles can be programmed to be automatically lowered (e.g., deployed) at later points in the route where the expected refuse payload is higher. In some examples, axles can be lifted based upon detected vehicle function (e.g., as received from the controller 106). For example, if the refuse truck 10 is traveling in reverse, the tag axle can be raised. In some examples, historical data or real-time data can be used to anticipate or detect rough terrain. One or more axles within the vehicle suspension 412 can be raised to prevent damage to the axles. Geo-fencing can extend around the dump or waste collection facility that can influence the number of axles deployed within the suspension 412, or can influence the height of the body assembly 14 relative to the frame 12. For example, when the GPS 408 detects that the refuse truck 10 has entered the waste collection facility (e.g., by crossing a geo-fence), the controller 106 can automatically raise one or more of the tag axle, tandem axle, and/or auxiliary axle. In some examples, sensors within the on-board receptacle 16 or upon the frame 12 detect the change in load created by the refuse within the refuse truck and automatically deploy one or more of the tag axle or tandem axle. Accordingly, manual interaction from the operator is limited.

The GPS 408 also allows the refuse truck 10 to learn routes that help to optimize refuse collection processes within a fleet of refuse trucks 10. As the refuse truck 10 navigates a collection route, the controller 106 and memory 108 can communicate conditions and data related to the route so that this information can be stored for subsequent use. The network 110 can access and manipulate the information within the memory 108 to develop optimized performance parameters and geo-fencing based upon the detected and experienced route conditions. The network 110 can then store or otherwise access the memory 108 so that other refuse trucks 10 within the same fleet can use the optimized and geo-fenced commercial routes generated by the refuse truck 10. Accordingly, the refuse truck 10 can operate using routes generated by any refuse truck within the fleet when the refuse truck has access to the memory 108 and/or the network 110.

Cab-Based Controls

In some examples, the refuse truck 10 is also configured to learn driver preferences and develop driver profiles as well. Driver preferences can be the product of cab controls 410 or HVAC 402, for example, or may follow driving preferences (e.g., mirror positioning, etc.) In some examples, the refuse truck 10 is further configured to generate profiles for each driver that operates equipment in the fleet. The refuse truck 10 can increase the amount of automation depending on the experience level of the user. For example, less experienced drivers can be defaulted to more automated processes while more experienced drivers may prefer more semi-autonomous operation. The refuse truck 10 adjusts these parameters to ensure that operational characteristics of the refuse truck 10 do not vary significantly based on driver experience level. Driver profiles can be stored centrally as well, within the network 110 or within the memory 108 so that several vehicles within the fleet can access the information and adjust vehicle performance accordingly.

Additional auxiliary systems 400 can be in communication with the controller 106, PDU 25, and battery 23 to send and receive data between the body assembly 14 and the frame 12. For example, the cab controls 410 can include a variety of different subsystems that can be actuated or otherwise manipulated from the cab 18, communicated to the controller 106, and then transmitted to the PDU 25 and/or battery 23 or prime mover 20. The cab controls 410 can include positioning or operational controls for operating each of the E-PTO 100 and hydraulics 300. For example, the cab controls 410 can be used to adjust a position of the lift system 30 or a frequency of the compactor 50 stroke. In some examples, the memory 108 and/or the network 110 stores additional parameters that modify or otherwise manipulate the interaction between the auxiliary systems 400 and the battery 23.

In some examples, the auxiliary systems 400 include sensors positioned within the on-board receptacle 16 or on the frame 12. The sensors are configured to measure the mass of the refuse within the on-board receptacle 16 and communicate with the controller 106 to automatically adjust operation of the compactor 50. While conventional compactors 50 operate each time the lift system 30 completes a refuse removal process by transferring refuse from a can into the on-board receptacle 16, the refuse truck 10 smartly monitors and waits until a threshold amount of refuse has been added before executing the compactor stroke. Because the compactor 50 can require a significant amount of hydraulic power from the E-PTO 100, limiting the number of compactor strokes can greatly reduce the electrical power draw by the electric motor 102 from the battery 23. Alternatively, sensors within the on-board receptacle 16 or along the body assembly 14 can visually monitor the volume of refuse and execute a compactor stroke when the volume of refuse added to the on-board receptacle exceeds a threshold amount. In still further examples, the interior of the on-board receptacle is configured with pressure sensors that communicate with the controller 106 when the sensors are contacted by an item within the on-board receptacle 16. Positioning the pressure sensors along the interior walls of the on-board receptacle 16 (and above the floor) can help to identify when large volumes of refuse have accumulated within the on-board receptacle, necessitating another compactor stroke.

In some examples, the cab controls 410 further include operator detecting sensors that can selectively disable the operation of the refuse truck 10, including the lift system 30. The operator detecting sensors are configured as proximity sensors that detect the presence of a key or tag within a specified target range. The key or tag can be worn or embedded within a vest that is to be worn by the operator of the refuse truck 10. The operator detecting sensors can then sense the presence of the operator within the cab 18 of the vehicle, for example, which can then be communicated to the controller 106 that the lift system 30 can be operated. In other examples, the proximity sensors are positioned at or near the forks 34 of the lift system 30, and the lift system 30 is disabled if the sensor detects the key or tag within a predetermined distance from the forks 34. In some examples, the sensor is a camera or other type of live imaging devices that monitors the area near the forks 34 and communicates with the controller 106 to disable operation of the lift system 30 if an operator is within a designated no occupancy zone. Similar sensors and logic can be used for the tailgate 26 operation as well. For example, if the sensors detect that a person is near the tailgate 26, the controller 106 will disable the hydraulic cylinder(s) or actuators that control the position of the tailgate 26 so that an ejection stroke is not performed. By monitoring the position of the driver or operators of the refuse truck 10, systems can be automatically disabled until the operator is in a preferred position relative to the refuse truck.

The cab controls 410 can also include a gate opener assembly 406. The gate opener assembly 406 is generally configured to interact with, unlock, and open gates that may be positioned to protect commercial or residential property. The gate opener assembly 406 can be at least partially controlled by the hydraulics 300 and the E-PTO 100, and can include one or more actuators (not shown) that extend forward of the cab 18 and the frame 12 to unlock and move gates that otherwise impede forward movement of the refuse truck 10 toward cans. In some examples, the gate opener 406 includes both forward and lateral sliding components that can accommodate different gate styles. The forward sliding components can be used to push gates about a rotational hinge joint, while the lateral sliding components can be used to slide gates laterally to permit access to the refuse truck 10. The gate opener assembly 406 can include a key or fob that is arranged to interact with a reader on the gate over one of near-field communication (NFC), Bluetooth, Wi-Fi, and/or radio frequency identification tag (RFID) technology, for example. In some examples, the cab controls 410 include a universal key transmitter that can transmit an identification code that can be used to unlock the gate. By including the gate opener assembly 406, iterative trips out of the cab 18 of the refuse truck 10 to open, move, close, and lock the gate can be avoided, which can provide significant time and labor cost savings. Using remote locking and unlocking provides additional security from unauthorized dumpster use, as customers no longer need to leave gates open or otherwise accessible for refuse collection processes. In some examples, the lock on the gate can include a reader that is configured to interact with refuse trucks 10 in the refuse truck fleet, and customers who have purchased and installed remote locking/unlocking readers will be charged at a lower rate due to the decreased labor cost associated with performing waste collection on their premises.

In some examples, the cab controls 410 include multiple displays within the cab 18 of the refuse truck 10. For example, a primary display can be centered along the dashboard (e.g., aligned with the steering wheel, etc.) and a secondary display can be positioned alongside the driver's seat. The cab controls 410 are configured to control the displays within the cab 18 depending upon the detected operation of the prime mover 20 and based upon information received by one or more of the PDU 25 and the controller 106. For example, during normal forward operation of the refuse truck, the primary display may show various vehicle performance characteristics, including vehicle speed, remaining battery life, motor temperature, fluid pressure, and the like. The secondary display may show information about the subsystems on the vehicle, including the hydraulics, such as the lift system 30 or compactor. In some examples, the secondary display provides a visual indication from a camera that is positioned in line with the lift system 30 that can be used by the operator to position the refuse truck 10 relative to a can to be picked up. If the cab controls 410 receive an indication that a refuse emptying process is going to be performed, the data presented on the displays may switch. The driver can remain focused with his or her head facing forward so that the travel of the vehicle can be watched at the same time that the camera is displaying the positioning of the lift system 30 relative to the can on the primary display. The secondary display can then present the various vehicle performance characteristics that are presented by the primary display under normal conditions. A similar process can be carried out when the refuse truck 10 begins traveling in reverse. The primary display can present the live images provided by the back-up camera, which can allow the driver to better position the vehicle and avoid otherwise awkward body positioning to drive the vehicle rearward. In some examples, the primary screen is incorporated directly into the steering wheel. Optionally, emergency information (e.g., battery life, oil pressure, etc.) is always displayed on the primary display, regardless of vehicle operational mode.

Power Distribution and Management

The refuse truck 10 can also include several power saving or power generation features to help further extend the life of the battery 23 and extend the allowable range of the refuse truck 10. For example, the HVAC 402 can be significantly simplified to reduce the number of pumps or compressors within the system. In some examples, the HVAC 402 within the body assembly 14 (and the cab 18, specifically) is in communication with the controller 106, PDU 25, and battery 23. The HVAC 402 can be a single integrated thermal management system that is configured to supply heating, cooling, and air flow to the entire body assembly 14 (e.g., to both the cab 18 and the on-board receptacle 16). In normal or standard operating conditions, the HVAC 402 can require a significant power draw from the battery 23. The power draw necessary to achieve desired climate control conditions is amplified when ambient outdoor temperatures are very high or very low. To avoid excessive power draw from the battery 23, the PDU 25 and the controller 106 can be configured to reduce, limit, or disable the HVAC 402 under certain operating conditions. For example, if the PDU 25 communicates that the remaining battery 23 life is low, the controller 106 can reduce the operation of the HVAC 402 to partial functionality. For example, pumps and compressors within the HVAC 402 may be disconnected from power but the fans can continue operating. If the remaining battery 23 life continues to fall, the PDU 25 and controller 106 can fully disable the HVAC 402 so that the remaining battery life is conserved for use with the prime mover 20.

The controller 106 and PDU 25 are further configured to adjust the power distribution from the battery 23 to the body assembly 14 based upon detected conditions within the battery 23 or upon the refuse truck 10, generally. The PDU 25 is configured to prioritize the systems within the refuse truck 10 so that electrical power from the battery 23 is distributed to critical systems before auxiliary systems. In some examples, the refuse truck 10 is configured to operate in a "limp home" mode. When the remaining battery 23 life falls below a set threshold (e.g., 10 percent charge remaining, 5 percent charge remaining, etc.), the PDU 25 and controller 106 can communicate to block, disable, or limit the operation of the different systems upon the body assembly 14. The HVAC 402 can be limited or temporarily disabled, the E-PTO 100 can be disconnected from electrical power (e.g., the electric motor 102 can be stopped), and the auxiliary systems 400 can be disconnected from the battery 23. In some examples, the refuse truck 10 is configured with two tiers of reduced operation. For example, when the remaining charge on the battery 23 falls below a first threshold (e.g., 10 percent), functionality of the E-PTO 100, hydraulics 300, and auxiliary systems 400 are reduced. The frequency of compactor 50 operation is reduced, the lift system 30 can be disabled to avoid adding more refuse into the on-board receptacle 16. The GPS 408 can continue to monitor the location of the refuse truck 10 and can communicate with the controller 106 and PDU 25 to allow for limited operation of the compactor 50 upon determining that the refuse truck 10 is positioned within a refuse collection site (e.g., a dump) so that an ejection stroke can be performed. Similarly, the controller 106 can operate the E-PTO 100 and hydraulics 300 to raise the tailgate 26 upon determining that an ejection stroke is being performed. If the remaining battery 23 power falls below a second threshold (e.g., 5 percent), the PDU 25 can reduce power supply from the battery 23 to the body assembly 14 so that only the prime mover 20 and the cab controls 410 (e.g., the dashboard and steering) remain operational until the refuse truck 10 is reconnected to the power source. The PDU 25 can limit the acceleration curve and/or maximum output of the prime mover 20 to further conserve battery power.

In some examples, the refuse truck 10 is configured to include supplemental power supplies and/or energy saving devices. For example, one or more solar panels can be positioned along the body assembly 14. In some embodiments, solar panels extend along a top of the cab 18 and the on-board receptacle 16. The solar panels can capture solar energy, which can be converted into usable battery power that can be stored and/or used by the battery 23. Additionally or alternatively, the refuse truck 10 can be outfitted with regenerative brakes. The brakes can harvest rotational energy or heat generated by the brakes while the refuse truck 10 drives so that battery power 23 can is conserved. The brakes can resupply the energy captured to the PDU 25 or to the battery 23.

Various modifications can be made to the body assembly 14 to further limit the consumption of electrical power from the battery 23. For example, a variety of different aerodynamic features can be incorporated into the body assembly 14 to reduce vehicle drag during normal travel conditions. In some embodiments, fairings are positioned between the on-board receptacle 16 and the cab 18. The fairings can help reduce drag that might otherwise be caused by low pressure zones behind the cab 18. Additionally, skirts can be incorporated into the frame 12 of the refuse truck to reduce air travel beneath the body assembly 14 to again reduce low pressure zones within the refuse truck 10 that can produce drag. The skirt can also provide additional protection to the battery 23 from debris or other items that might contact the frame 12 of the refuse truck 10. In some examples, the skirt is configured to deploy when the refuse truck reaches a threshold speed. For example, the skirt can deploy when the controller 106 detects that the vehicle has reached a speed in excess of 20 miles per hour. The tailgate 26 can also be modified to reduce drag by incorporating a gradual taper or tail-like shape. The tailgate 26 design reduces the size of the low pressure zone formed behind the refuse truck 10 as it travels.

The lift system 30 can also be selectively positioned to reduce drag and battery power consumption by the refuse truck. The forks 34 of the lift system 30 can be moved between several positions to help improve the aerodynamics of the refuse truck 10. For example, the forks 34 can be positioned in a first location near the frame 12 of the vehicle in a rest position prior to engaging a can. The forks 34 can transition to a second, raised position to execute the refuse collection process to empty refuse into the on-board receptacle 16. The forks 34 can also be positioned in a third, intermediate position for traveling. The third, intermediate position can be between the first position and the second position and can arrange the forks 34 to maximize the aerodynamic effect of the forks 34 (e.g., to reduce drag). In the third position, the forks 34 are directed approximately parallel to the ground below. Optionally, the forks 34 can be provided with an aerodynamic sheath that can receive the forks 34 when not in use to further improve the aerodynamics of the vehicle.

In some examples, the body assembly 14 is reduced in size to further reduce the amount of energy consumption needed to operate the refuse truck 10. In some examples, the height of the lift system 30 or the range of permissible travel of the lift system 30 is reduced. Accordingly, the hydraulics 300 operating the lift system 30 can be reduced in size and complexity, and less power is needed to transition the lift system 30 between the lowered and raised positions to execute a waste removal process. In some examples, the size of the cab 18 is reduced so that only a single occupant can reside within the cab 18. Reducing the size of the cab 18 reduces the weight of the body assembly 14 and significantly reduces the power consumption of the HVAC system 402, as the area for climate control is reduced. In some examples, the entire body assembly 14 is formed from a single, unitary structure. The cab 18 and on-board receptacle 16 can be made from a continuous body, and the sub-frame and ladder frame traditionally used to mount the body assembly 14 is removed. The removal of more body assembly 14 components further reduces the mass of the refuse truck 10, and allows for additional useful weight to be added to the frame 12, like additional batteries 23.

Sound Management System

As discussed above, the refuse vehicle 10 may include a sound management system 420 as one of the auxiliary systems 400. The sound management system 420 is configured to reduce a perceived audio output of the refuse vehicle 10. For example, the sound management system 420 may utilize passive noise cancellation, active noise cancellation, adaptive active noise cancellation, adjustable active noise cancellation, and any combination thereof to reduce the perceived audible output of the refuse vehicle 10. The sound management system 420 may be communicably coupled to any of the components of the refuse vehicle 10, including the controller 106, the E-PTO System, the electric motor 20, and any of the other auxiliary systems 400 (e.g., the Global Positioning System (GPS) 408).

Figure 6:
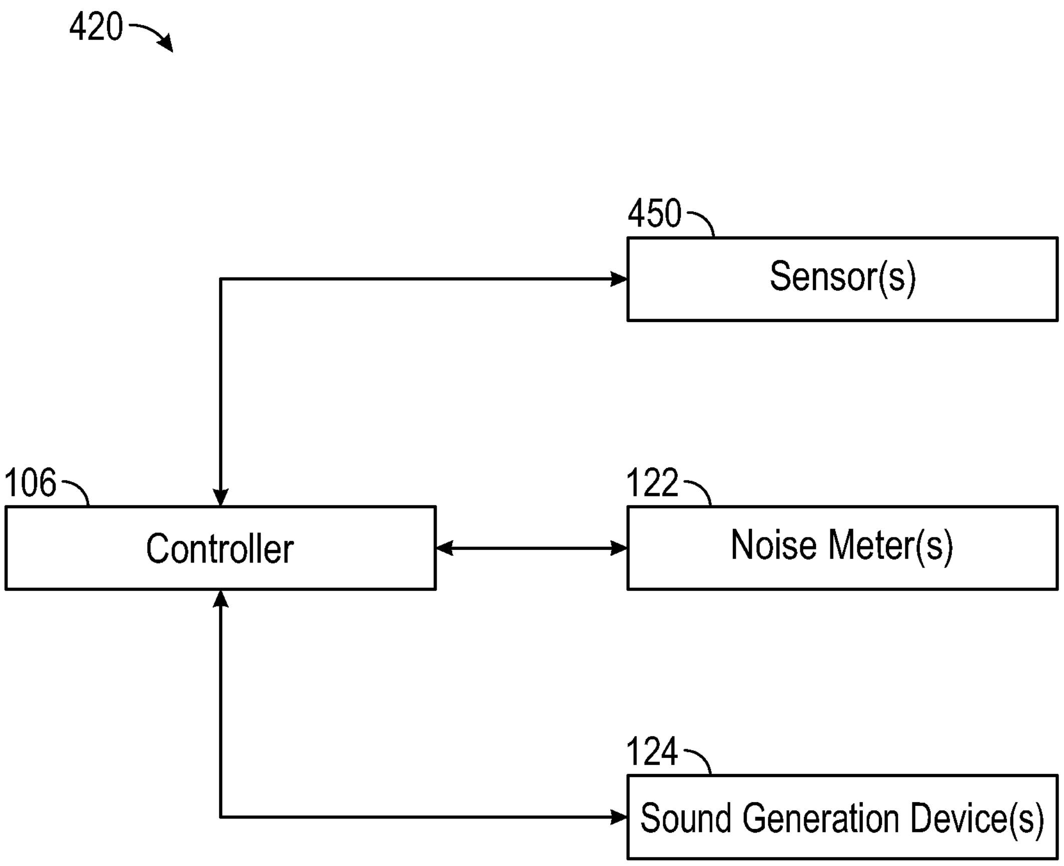
FIG. 6 is a schematic view of a sound management system of the refuse vehicles of FIGS. 1-4.

Referring now to FIG. 6, a schematic view of the sound management system 420 is shown. The sound management system 420 includes a controller 106. It should be appreciated that the controller 106 may be utilized by any number of systems included on the refuse vehicle 10. Alternatively, the refuse vehicle 10 may include a separate controller dedicated to just the sound management system 420. The sound management system 420 is shown to include one or more sound generation devices 124, such as speakers. According to various embodiments, the one or more sound generation devices 124 may output noise reducing sounds. For example, the speakers may output white noise to mask the sounds output by various components of the refuse vehicle 10. In this sense, the sound management system 420 may engage in passive noise cancellation.

The sound management system 420 is shown to include one or more noise meters 122 (e.g., microphones) configured to detect noise output by the refuse vehicle 10. The one or more noise meters 122 are shown to be communicably coupled to the controller 106. In this sense, the sound management system 420 may engage in active noise cancellation. For example, the one or more noise meters 122 may detect sound emitted by the E-PTO system 100 and provide noise data to the controller 106, wherein the noise data is indicative of the sound detected by the one or more noise meters 122. The controller 106 may then cause the one or more sound generation devices 124 to emit anti-phase sounds (e.g., anti-noise, noise reducing sounds, etc.) in response to receiving the noise data from the one or more noise meters 122. For example, the one or more noise generation devices 24 may emits a sound wave with the same amplitude as the detected sound but with inverted phase (also known as anti-phase) relative to the original sound. The waves combine to form a new wave, in a process called interference, and effectively cancel each other out—an effect which is called destructive interference. The anti-phase sounds may thereby reduce some or all the noise detected by the noise meters 122 such that the perceived audio output of the refuse vehicle is reduced. In this sense, the sound management system 420 may engage in active noise cancellation.

As discussed further above with respect to FIGS. 1-4, the refuse vehicle 10 may include a plurality of noise meters 122 positioned about the refuse vehicle 10. For example, the refuse vehicle 10 may include one or more noise meters 122 proximate the E-PTO system 100 (e.g., coupled to the E-PTO housing 120). According to various embodiments, the E-PTO system 100 may generate relatively high levels of noise pollution. Thus, by placing noise meters 122 proximate the E-PTO housing 120, improved noise data may be captured by the noise meters 122 because of the proximity to the source of the noise. Additionally, a plurality of sound generation devices 124 may be positioned proximate the E-PTO system 100 (e.g., coupled to the E-PTO housing 120). By positioning the sound generation devices 124 proximate the source of the noise, improved active noise cancellation may be accomplished.

As shown, the sound management system 420 further includes one or more sensors 450. The one or more sensors 450 are configured to provide operating condition data to the controller 106. For example, one or more sensors 450 may be configured to detect an operating speed of a motor (e.g., the electric motor 20 and/or the electric motor 102). In this example embodiment, the controller 106 may adjust the noise reducing sounds emitted by the sound generation devices 124 in response to detecting a change in the operating condition data. For example, if the speed of the electric motor 20 and/or the speed of the electric motor 102 increases, the controller may cause the sound generation devices 124 to increase the level of noise reducing sounds emitted. Further, if the speed of the electric motor 20 and/or the speed of the electric motor 102 decreases, the controller may cause the sound generation devices 124 to decrease the level of noise reducing sounds emitted. In this sense, the amount of noise reduction performed by the sound management system 420 is based upon the operating conditions of the refuse vehicle.

Additionally, one or more of the sensors 450 may be configured to provide location data to the controller. For example, one or more of the sensors 450 may be a part of the GPS 408 discussed above with respect to FIG. 5. The one or more sensors 450 may provide location data to the controller 106. The controller 106 may then control the one or more sound generation devices 124 based on the location data. For example, the controller 106 may increase the level of noise reducing sounds being emitted from the sound generation devices 124 in response to entering a predefined geo-fenced area (e.g., a residential neighborhood). Further, the controller 106 may decrease the level of noise reducing sounds being emitted from the sound generation devices 124 in response to entering another predefined geo-fenced area (e.g., an interstate highway). Further, the controller 106 may cause one or more components (e.g., the hydraulic pump 104, the motor 102, etc.) to ramp down and/or shut down in response to entering a predefined geo-fenced area (e.g., a residential neighborhood). The predefined geo-fenced areas may be stored in the memory 108 such that the controller 106 may determine if the refuse vehicle is within the geo-fenced area based on the location data.

Although this description may discuss a specific order of method steps, the order of the steps may differ from what is outlined. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

Additional Arrangements

Figure 7:
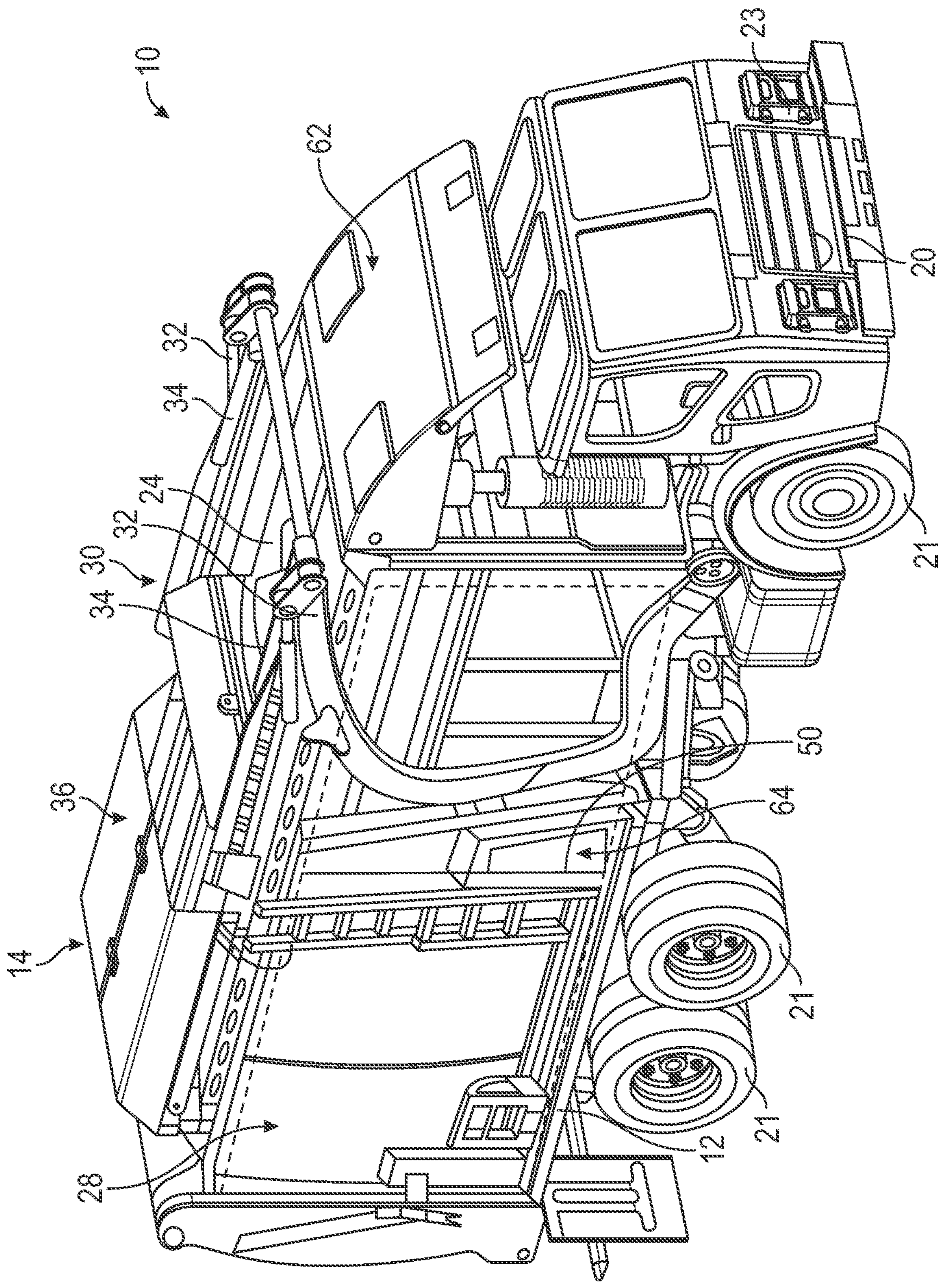
FIG. 7 is a front perspective view of an electric front loading refuse vehicle according to an exemplary embodiment.

Referring to FIG. 7, the refuse truck 10 is a front loading E-refuse vehicle. Like the refuse truck 10 shown in FIG. 1, the E-refuse vehicle includes a lifting system 30 that includes a pair of arms 32 coupled to the frame 12 on either side of the cab 18. The arms 32 are rotatably coupled to the frame 12 with a pivot (e.g., a lug, a shaft, etc.). In some embodiments, actuators (e.g., hydraulic cylinders, etc.) are coupled to the frame 12 and the arms 32, and extension of the actuators rotates the arms 32 about an axis extending through the pivot. According to an exemplary embodiment, interface members, shown as forks 34, are coupled to the arms 32. The forks 34 have a generally rectangular cross-sectional shape and are configured to engage a refuse container (e.g., protrude through apertures within the refuse container 92, etc.). During operation of the refuse truck 10, the forks 34 are positioned to engage the refuse container (e.g., the refuse truck 10 is driven into position until the forks 34 protrude through the apertures within the refuse container). A second actuator (e.g., a hydraulic cylinder) articulates the forks 34 to tip the refuse out of the container and into the hopper volume of the collection chamber 28 through an opening in the cover 24. The actuator thereafter rotates the arms 32 to return the empty refuse container to the ground. According to an exemplary embodiment, a top door 36 is slid along the cover 24 to seal the opening thereby preventing refuse from escaping the collection chamber 28 (e.g., due to wind, etc.).

Still referring to FIG. 7, the refuse truck 10 includes one or more energy storage devices, shown as batteries 23. The batteries 23 can be rechargeable lithium-ion batteries, for example. The batteries 23 are configured to supply electrical power to the prime mover 20, which includes one or more electric motors. The electric motors are coupled to the wheels 21 through a vehicle transmission, such that rotation of the electric motor (e.g., rotation of a drive shaft of the motor) rotates a transmission shaft, which in turn rotates the wheels 21 of the vehicle. The batteries 23 can supply additional subsystems on the refuse truck 10, including additional electric motors, cab controls (e.g., climate controls, steering, lights, etc.), the lifting system 30, and/or the compactor 50, for example.

Figure 8:
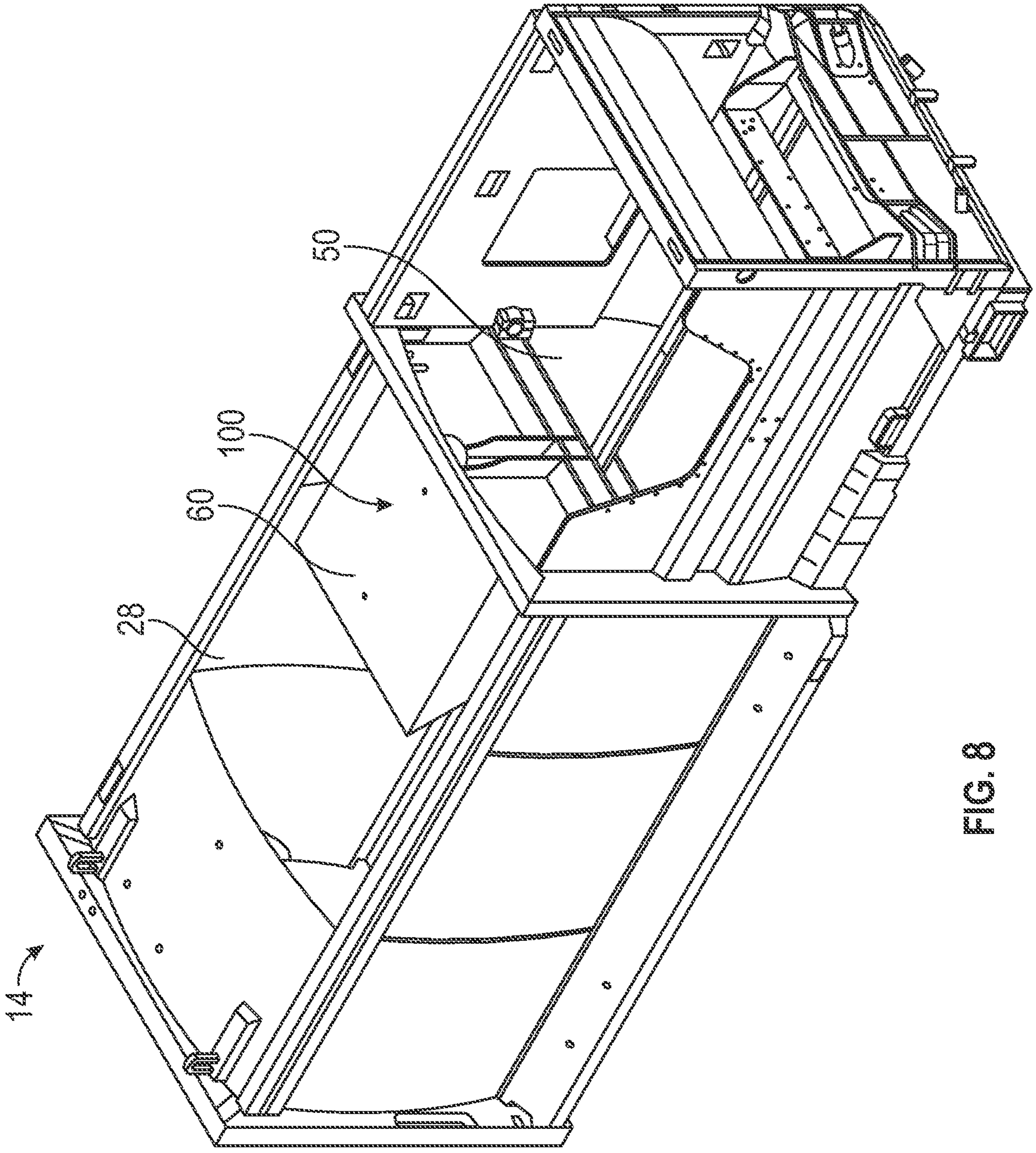
FIG. 8 is a top perspective view of a body assembly of the refuse vehicle of FIG. 3, according to an exemplary embodiment.
Figure 9:
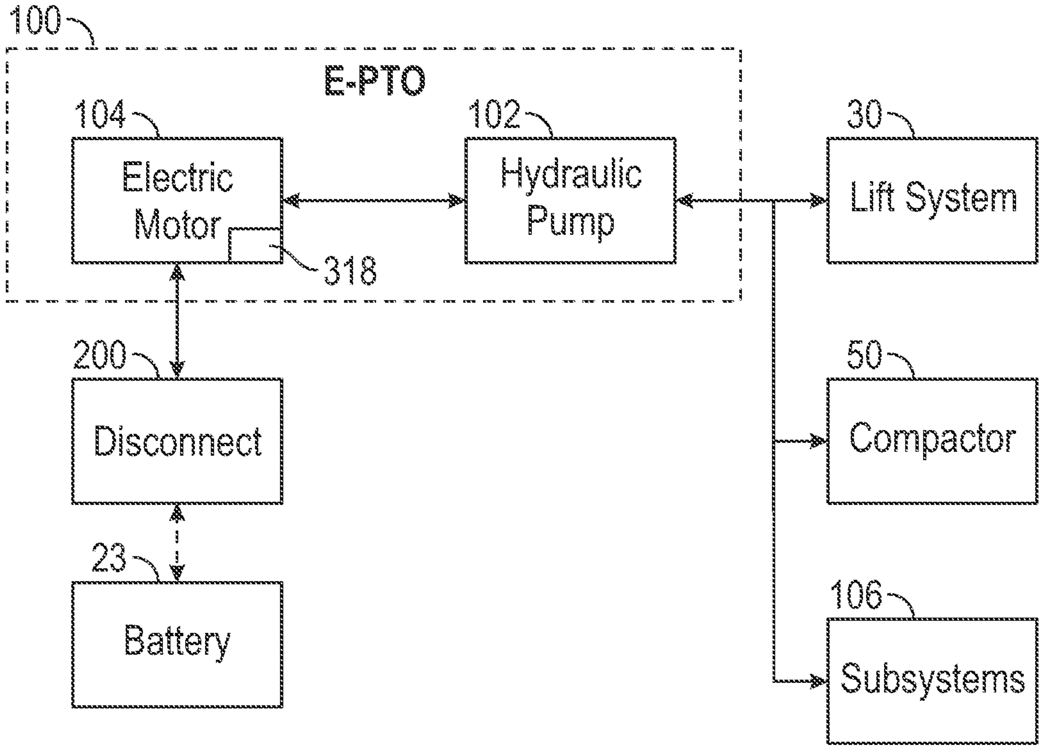
FIG. 9 is a schematic view of a control system of the refuse vehicle of FIG. 3.

The refuse truck 10 can be considered a hybrid refuse vehicle because it includes both electric and hydraulic power systems. As depicted in FIGS. 7-9, the refuse truck 10 includes an E-PTO system 100. The E-PTO system 100 is configured to receive electrical power from the batteries 23 and convert the electrical power to hydraulic power. In some examples, the E-PTO system 100 includes an electric motor driving one or more hydraulic pumps 102. The hydraulic pump 102 pressurizes hydraulic fluid from a hydraulic fluid reservoir onboard the refuse truck 10, which can then be supplied to various hydraulic cylinders and actuators present on the refuse truck 10. For example, the hydraulic pump 102 can provide pressurized hydraulic fluid to each of the hydraulic cylinders within the lift system 30 on the refuse truck. Additionally or alternatively, the hydraulic pump 102 can provide pressurized hydraulic fluid to a hydraulic cylinder controlling the compactor 50. In still further embodiments, the hydraulic pump 102 provides pressurized hydraulic fluid to the hydraulic cylinders that control a position and orientation of the tailgate 26. The E-PTO system 100 can be positioned about the refuse truck 10 in various different places. For example, the E-PTO system 100 may be positioned within a housing 60 above or within the on-board receptacle 16 (see FIG. 6), beneath a canopy 62 extending over a portion of the cab 18, or within a dedicated housing 64 alongside the vehicle body 14. Although the E-PTO system 100 may be in electrical communication with the batteries 23, the E-PTO system 100 can be separate from and spaced apart from the vehicle frame 12.

With continued reference to FIG. 9, the refuse truck 10 includes a disconnect 200 positioned between the batteries 23 and the E-PTO system 100. The disconnect 200 provides selective electrical communication between the batteries 23 and the E-PTO system 100 that can allow the secondary vehicle systems (e.g., the lift system, compactor, etc.) to be decoupled and de-energized from the electrical power source. The disconnect 200 can create an open circuit between the batteries 23 and the E-PTO system 100, such that no electricity is supplied from the batteries 23 to the electric motor 104. Without electrical power from the batteries 23, the electric motor 104 will not drive the hydraulic pump(s) 102. Pressure within the hydraulic system will gradually decrease, such that none of the lifting system 30, compactor 50, or vehicle subsystems 106 relying upon hydraulic power will be functional. The refuse truck 10 can then be operated in a lower power consumption mode, given the reduced electrical load required from the batteries 23 to operate the refuse truck 10. The disconnect 200 further enables the refuse truck 10 to conserve energy when the vehicle subsystems are not needed, and can also be used to lock out the various vehicle subsystems to perform maintenance activities. The disconnect 200 further allows an all-electric vehicle chassis to be retrofit with hydraulic power systems, which can be advantageous for a variety of reasons, as hydraulic power systems may be more responsive and durable than fully electric systems. In some examples, the E-PTO system 100 includes a dedicated secondary battery 108 that is configured to supply electrical power to the E-PTO system 100 if the disconnect 200 is tripped, such that the secondary vehicle systems can remain operational even when the E-PTO system 100 is not receiving electrical power from the batteries 23.

Figure 10:
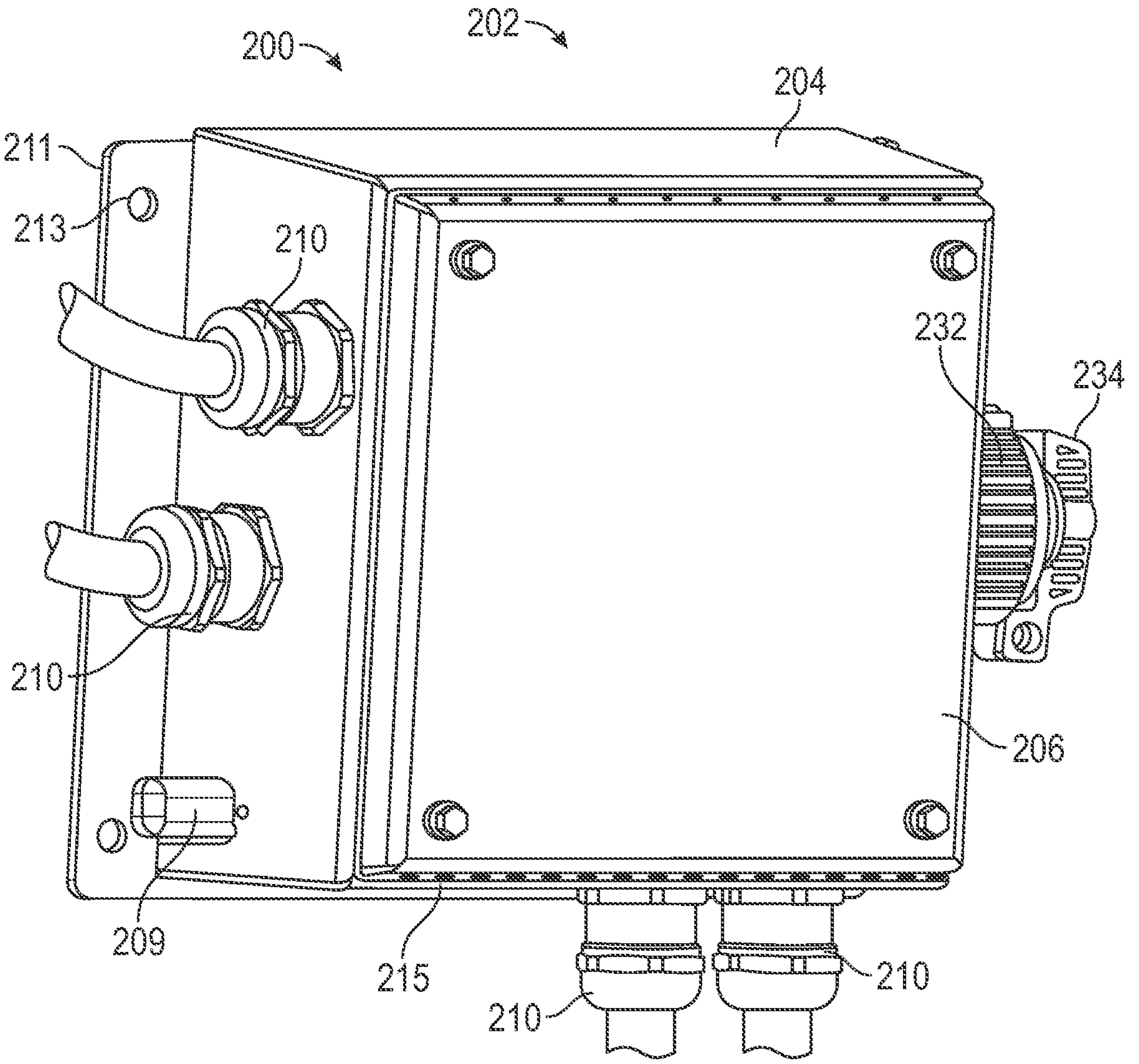
FIG. 10 is a perspective view of an electric power control box included within the control system of FIG. 5 and the refuse vehicle of FIG. 3.
Figure 11:
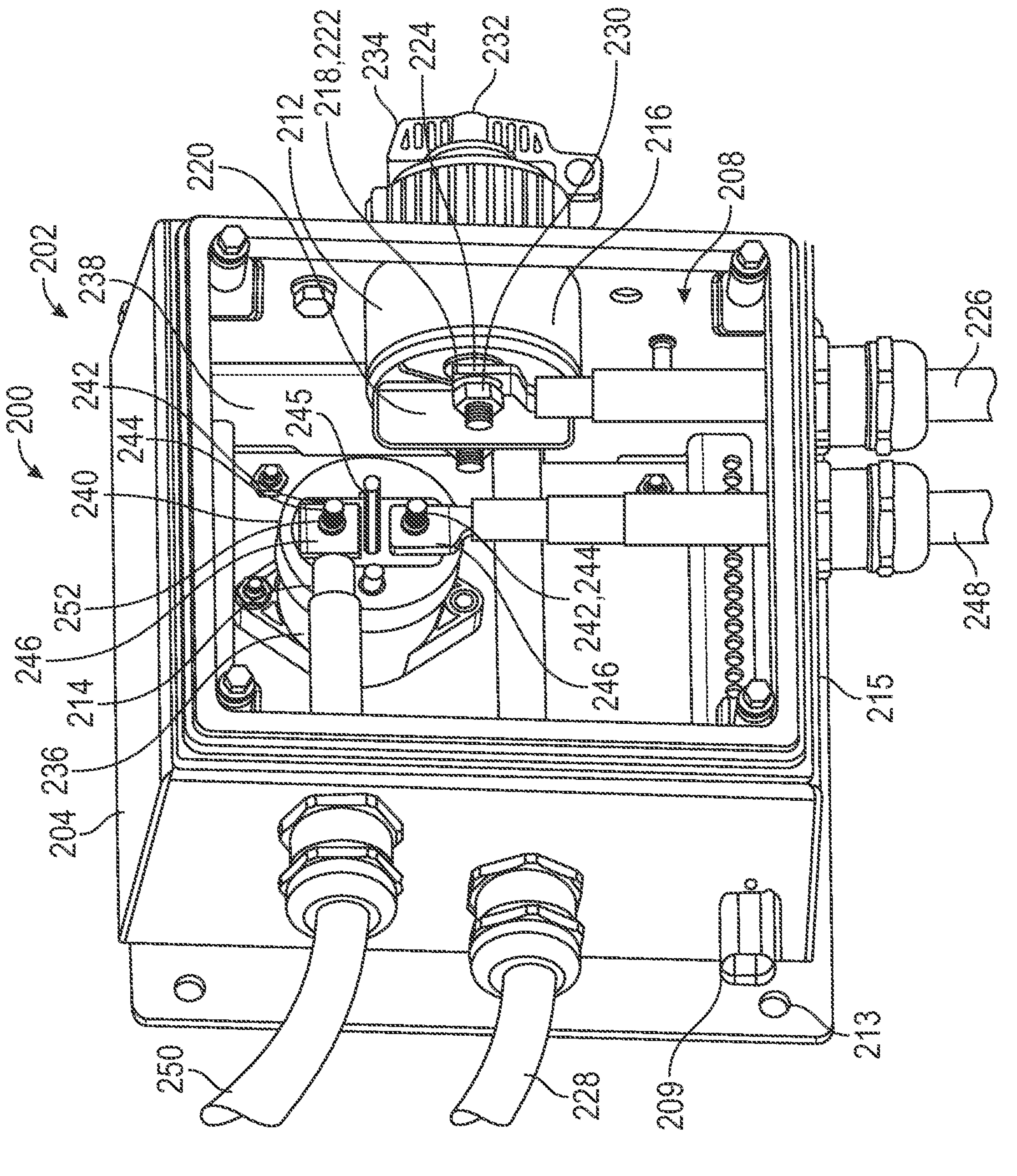
FIG. 11 is a perspective view of the electric power control box of FIG. 6 with a cover of the electric power control box removed.

FIGS. 10-11 depict an electric power control box 202 that can function as the disconnect 200. The electric power control box 202 generally includes a housing 204 and a cover or door 206 that together define a waterproof cavity 208. The waterproof cavity 208 receives and supports electrical connections between the E-PTO system 100 and the batteries 23 to create a selective electrical coupling between the two. Fittings 210 are positioned about the perimeter of the housing 204 and define passages through the housing 204 to receive electrical inputs. The fittings 210 can be rigidly coupled (e.g., welded) or removably coupled (e.g., threaded) to the housing 204 so that a water tight seal is formed between the fittings 210 and the housing 204. In some examples, a low voltage connector tube 209 extends through the housing 204 and into the cavity 208 as well. The housing 204 is configured to be mounted to the body 14 of the refuse truck 10. In some examples, the housing 204 is positioned within the cabinet housing 64 formed alongside the body 14. As depicted in FIGS. 10-11, the housing 204 includes a mounting flange 211 extending around at least a portion of the housing 204. The mounting flange 211 includes a plurality of mounting holes 213 that can be used to fasten the housing 204 to the body 14 of the refuse truck 10. In some examples, a vent 215 is formed within an underside of the housing 204 to allow cooling air to enter into the cavity 208.

The electric power control box 202 provides a positive terminal connection or bus 212 and a negative terminal connection or bus 214 to create an electrical coupling between the E-PTO system 100 and the batteries 23. As depicted in FIG. 11, the positive terminal bus 212 has a generally cylindrical body 216 and defines two distinct terminals 218 that are separated from one another by a dividing wall 220. In some examples, the terminals 218 are at least partially defined by threaded shanks 222 extending outward from the body 216 to receive and secure cable connectors 224 (e.g., ring terminals, two-pole high voltage connectors with integrated high voltage interlock loop as depicted herein, etc.). For example, one of the threaded shanks 222 can receive the connector 224 that is coupled to a high voltage positive shielded cable 226 that is coupled to the batteries 23, while the other terminal 218 can receive the connector 224 that is coupled to a high voltage positive shielded cable 228 that extends to the E-PTO system 100. If the connectors 224 are formed as ring terminals, a nut 230 can be used to secure the connectors 224 in place on each respective terminal 218. An electrical coupling is then established between each cable 226, 228 and the positive terminal bus 212 by joining the conductive connectors 224 to the conductive shanks 222, which extend inward to an internal circuit within the cylindrical body 216, as explained in additional detail below. The dividing wall 220 can help prevent unwanted direct contact between the connectors 224 of the positive shielded cables 226, 228. In some examples, the connector 224 on the cable 228 can be formed so that the ring portion extends perpendicularly away from a longitudinal axis of the cable 228. Accordingly, the cable 228 can be coupled to the terminal 218 without bending or otherwise manipulating a shape of the cable 228.

The positive terminal bus 212 includes an externally accessible switch 232 that allows a user to manually control the electrical connections within the positive terminal bus 212. As depicted in FIG. 11, the cylindrical body 216 of the positive terminal bus 212 extends through and out of the housing 204. A waterproof cap 234 is hingedly coupled to an external end of the body 216 to provide selective access to a switch 232 within the body 216. As explained below, the switch 232 is movable between an open position and a closed position. In the closed position, the terminals 218 are electrically coupled to one another and electrical power transmitted through the cable 226 can be transferred through the positive terminal bus 212 to the cable 228 and to the E-PTO system 100. In the open position, the terminals 218 are electrically decoupled and electrical communication between the cables 226, 228 is blocked.

Figure 12:
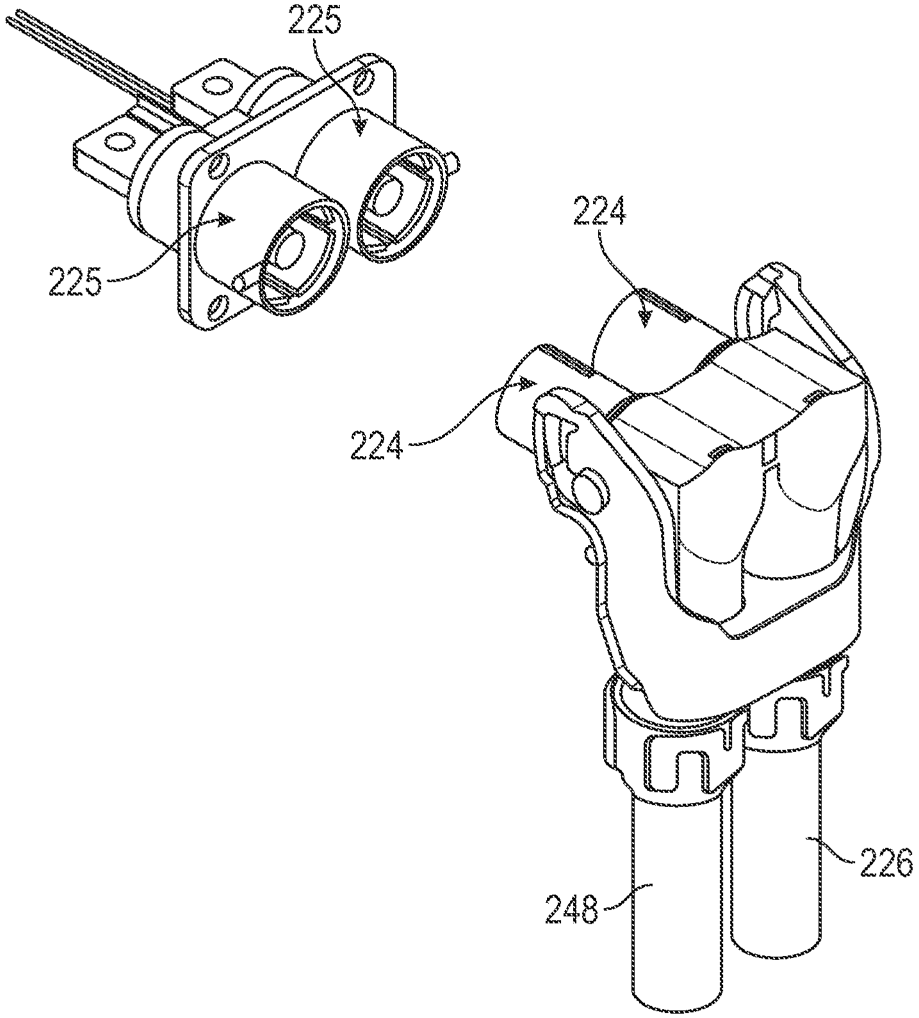
FIG. 12 is a perspective view of a plug that can be used within the electric power control box of FIG. 6.

The negative terminal bus 214, like the positive terminal bus 212, includes a generally cylindrical body 236. The generally cylindrical body 236 is mounted (e.g., using fasteners) to a back wall 238 of the housing 204. In some examples, the cylindrical body 236 is coupled to a ground plate 240 that extends partially along the back wall 238 of the housing 204. The negative terminal bus 214 supports two terminals 242 that are again separated from one another by a dividing wall 245. The terminals 242 are again formed as threaded shanks 244 extending outward from the body 236 to receive and secure cable connectors 246 (e.g., ring terminals, two-pole high voltage connectors with integrated high voltage interlock loop as depicted in FIG. 812, etc.) As depicted in FIG. 11, one of the threaded shanks 244 receives a connector 246 that is coupled to a high voltage negative shielded cable 248 that is coupled to the batteries 23, while the other terminal 242 receives a connector 246 that is coupled to a high voltage negative shielded cable 250 that is coupled to the E-PTO system 100. If the connectors 246 are ring terminals, nuts 252 can be used to secure the connectors 246 in place on each respective terminal 242. With the nuts 252 securing the connectors 246 to the terminals 242, an electrical coupling is established between each cable 248, 250 and the negative terminal bus 214. The divider wall 245 can inhibit unwanted direct contact between the connectors 246, which in turn prevents unwanted direct contact between the cables 248, 250. Alternatively, each of the connectors 224, 246 can be formed as two-pole high voltage connectors with integrated high voltage interlock loops, as depicted in FIG. 12. The connector 224 can be plugged into female terminals 225 formed in the positive terminal bus 212 while the connector 246 can be plugged into female terminals 247 formed in the negative terminal bus 214.

Figure 13:
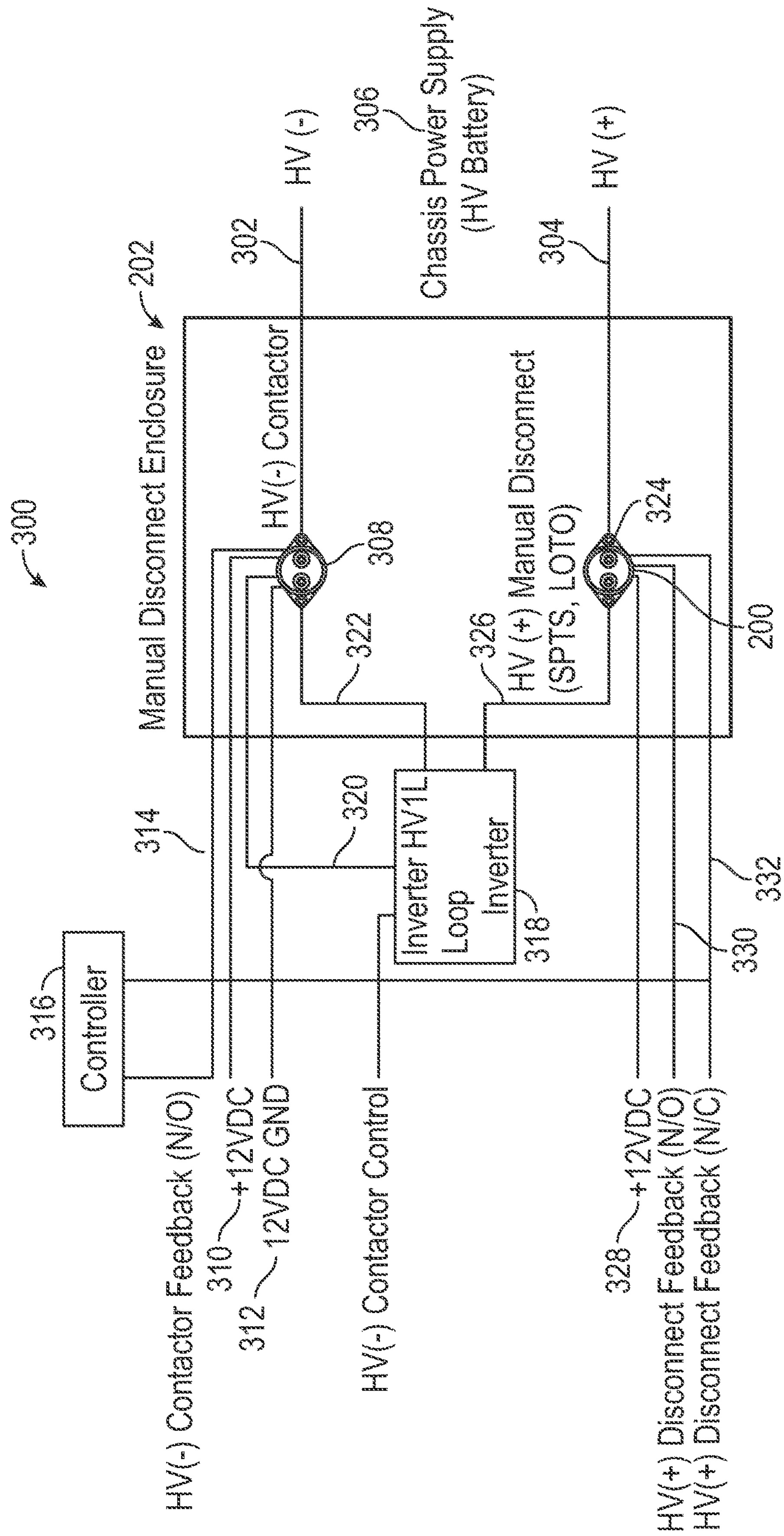
FIG. 13 is a schematic view of a circuit that can be used in and by the electric power control box of FIG. 6.
Figure 14:
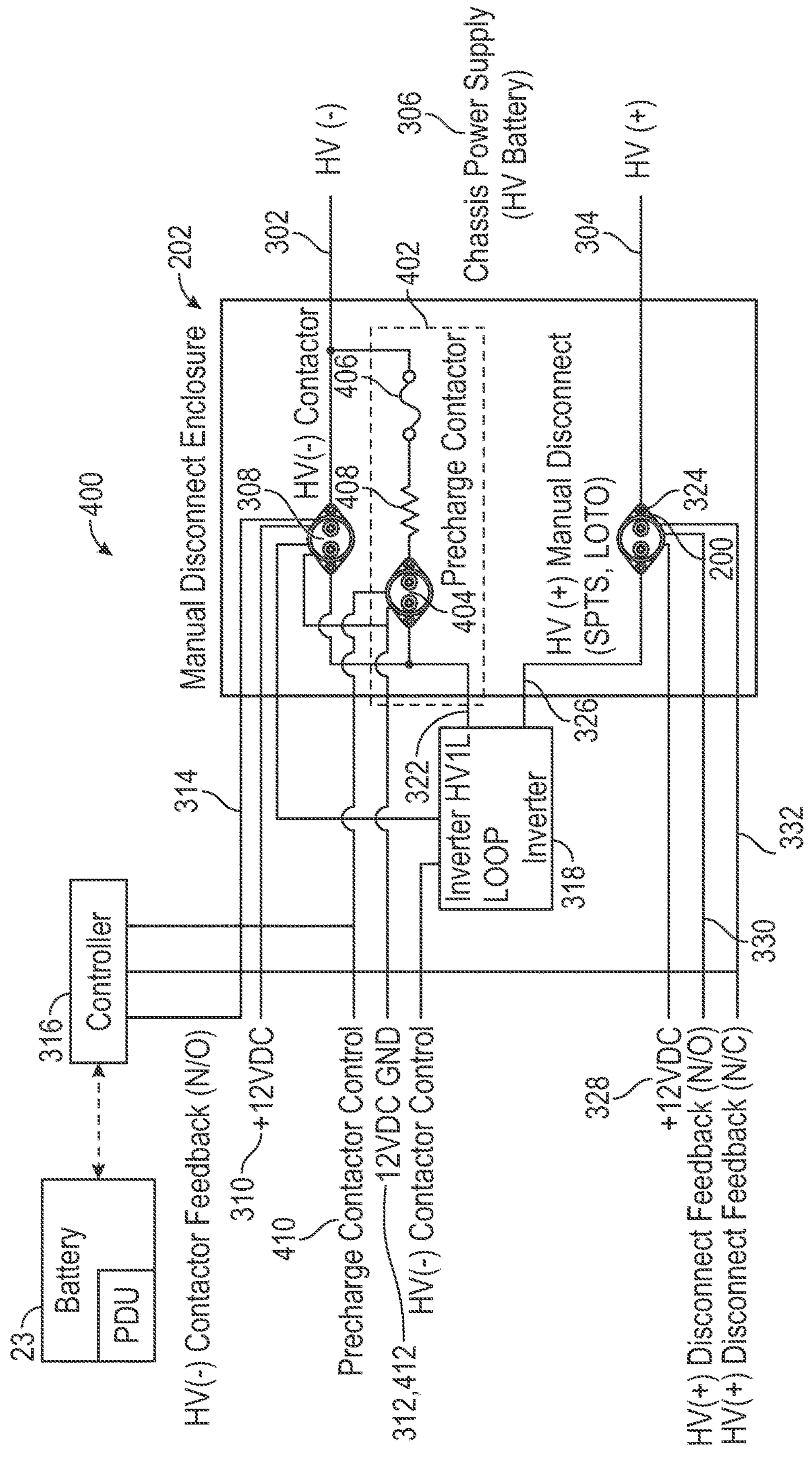
FIG. 14 is a schematic view of an alternative circuit that can be used in and by the electric power control box of FIG. 6.
Figure 15:
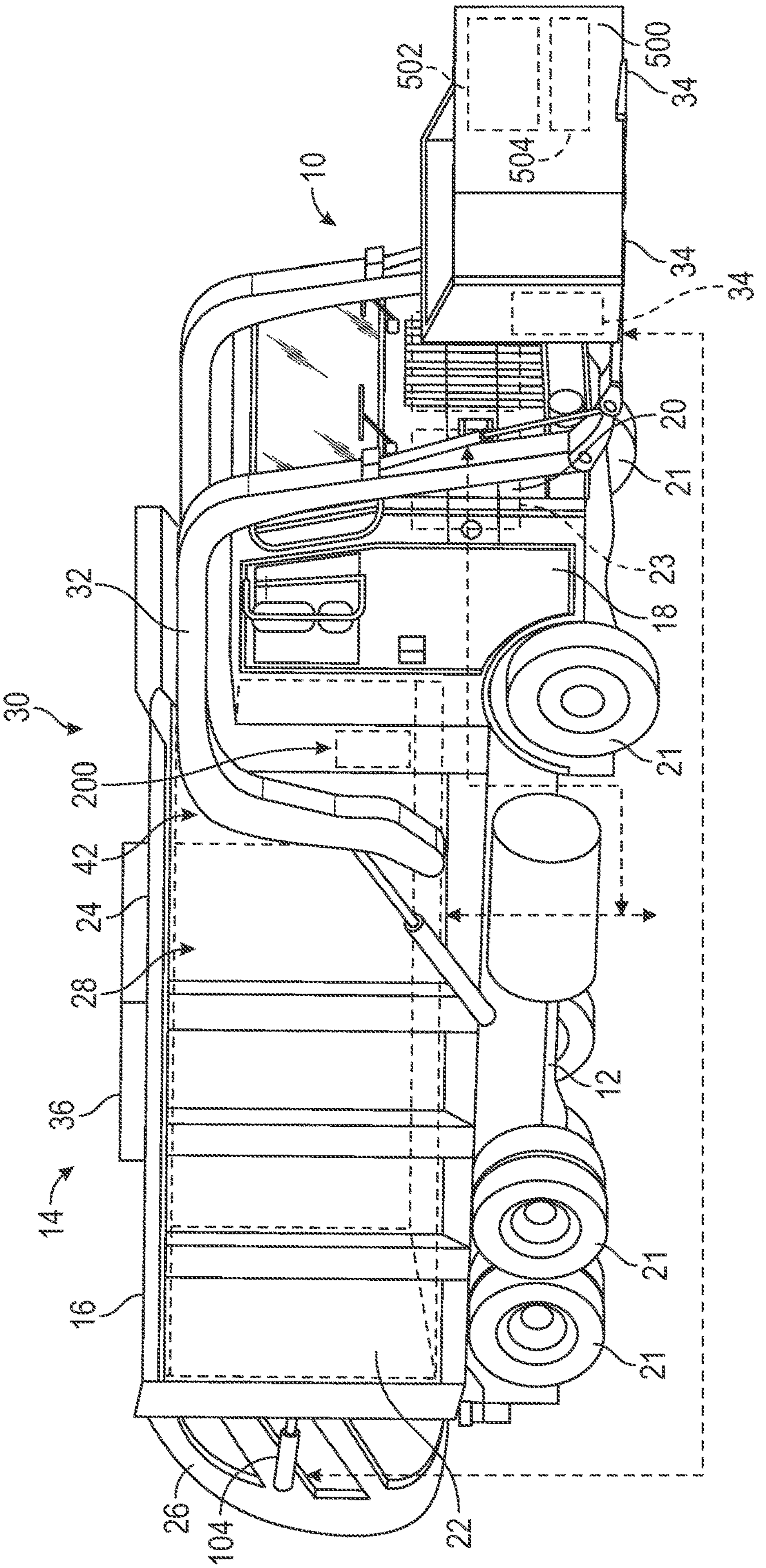
FIG. 15 is a perspective view of the front loading refuse vehicle of FIG. 1 coupled with a carry can device.

With additional reference to FIGS. 13-14, the operation of the electric power control box 202 and disconnect 200 is described in additional detail with reference to the circuit 300. As depicted in FIG. 13, the electric power control box 202 includes high voltage inputs 302, 304 coming from the chassis battery power supply 306. The high voltage inputs 302, 304 can be the negative shielded cable 248 and the positive shielded cable 226, for example, that extend away from and supply electrical power from the batteries 23 (which can constitute the chassis battery power supply 306).

The high voltage input 302 is coupled to a negative high voltage contactor 308. In some examples, the negative terminal bus 214 serves as the negative high voltage contactor 308. The negative high voltage contactor 308 is electrically coupled to an auxiliary low voltage source 310 and to ground 312. In some examples, the auxiliary low voltage source 310 is a 12 V battery that is configured to toggle a contactor switch within the negative high voltage contactor 308 between an open position and a closed position. In the open position, the terminals 242 of the negative terminal bus 214 are electrically decoupled and in the closed position, the terminals 242 of the negative terminal bus 214 are electrically coupled to one another through the contactor switch. A negative contactor feedback line 314 coupled to a controller 316 can monitor and/or control the operation of the contactor switch. The negative contactor feedback line 314 can detect a welded contactor at system startup, and is configured to open immediately if a high voltage cable (e.g., high voltage outputs 322, 326) is unplugged from an inverter 318 of the E-PTO system 100. In some examples, the inverter 318 of the E-PTO system 100 is coupled to the negative high voltage contactor 308 using a wire 320. The wire 320 can be used to ground the inverter 318. A high voltage output 322, such as the negative shielded cable 250, is also coupled to the other terminal on the negative high voltage contactor 308. Accordingly, when the contactor switch is closed, electrical power can be transmitted from the high voltage input 302, through the negative high voltage contactor 308, and to the high voltage output 322. The high voltage output 322 can provide direct current (DC) power to the inverter 318, where it is inverted into alternating current (AC) power for use by the electric motor 104 or with additional components on the vehicle (e.g., vehicle lights, climate control systems, sensors, displays, cab controls, or other auxiliary systems within the refuse truck, etc.).

The high voltage input 304 is coupled to a positive high voltage contactor 324 that also serves as a manual disconnect. For example, the positive high voltage contactor 324 can be the positive terminal bus 212 shown and described with respect to FIGS. 10-11. The positive high voltage contactor 324 includes terminals (e.g., terminals 218) that receive the high voltage input 304 and a high voltage output 326. The high voltage input 304 can be the positive shielded cable 226 while the positive high voltage output 326 can be the positive shielded cable 228, for example. The positive high voltage output 326 is coupled to the inverter 318 so that DC electrical power is supplied from the batteries 23, through the positive high voltage contactor 324, to the inverter 318, which then transforms the DC power to AC power for use by the electric motor 104. A second auxiliary power source 328 can also be coupled to the positive high voltage contactor 324. The second auxiliary power source 328 can be a 12 V battery, for example. In some examples, the second auxiliary power source 328 is in communication with the controller 316 and is configured to receive instructions from the controller 316 to control a contactor switch within the positive high voltage contactor 324. The positive high voltage contactor 324 can also include one or more disconnect feedback lines 330, 332 that can monitor the status of the positive high voltage contactor 324 to provide information to one or more of the E-PTO system 100, the batteries 23, or the controller 316, for example. In some examples, the disconnect feedback lines 330, 332 are coupled to the disconnect 200 and are wired to a common power source (e.g., the second auxiliary power source 328). When the disconnect 200 is closed, the first disconnect feedback line 330 will have 12 V while the second disconnect feedback line 332 will have 0 V. When the disconnect 200 is opened, the first disconnect feedback line 330 will have 0 V and the second disconnect feedback line 332 will have 12 V. In some examples, the controller 316 provides a fault signal if both disconnect feedback lines 330, 332 carry the same voltage.

As indicated above, the positive high voltage contactor 324 includes a disconnect 200 that can manually open a contactor switch within the positive high voltage contactor 324 to decouple the terminals 218 and decouple the high voltage input 304 from the high voltage output 326. In some examples, the disconnect 200 is a single pole, single throw (SPST) switch that can be manually moved between an open position and a closed position. In the open position, the terminals 218 are decoupled from one another and electrical power cannot pass between the battery 23 to the E-PTO system 100 through the high voltage input 304 and the high voltage output 326. In the closed position, the terminals 218 are electrically coupled and electrical power from the battery 23 is supplied through the positive high voltage contactor 324 to the inverter 318 of the E-PTO system 100 to drive the electric motor 104. The disconnect 200 can be locked out in the open position, so that the E-PTO system 100 remains decoupled from the battery 23 when maintenance is being performed, for example.

Referring now to FIG. 14, another circuit 400 that can be used to control and operate the disconnect 200 and the electric power control box 202 is depicted. The circuit 400 differs from the circuit 300 in that a pre-charge circuit 402 and pre-charge contactor 404 are included within the electric power control box 202. The pre-charge circuit 402 is in selective electrical communication with the high voltage input 302 and the high voltage output 322 using a switch 406. In some examples, the switch 406 is controlled by the controller 316. The pre-charge circuit 402 further includes a resistor 408 in series with the switch 406. In some examples, the pre-charge contactor 404 is grounded by the ground line 412. The high voltage output 322 is electrically coupled to the pre-charge contactor 404 as well, and is configured to be energized by the high voltage input 302. As explained below, the pre-charge circuit 402 is designed to prevent high inrush currents that could otherwise damage the wiring or electrical connections within the disconnect 200.

Each of the circuits 300, 400 are designed to form a reliable and efficient selective electrical coupling between the battery 23 and the E-PTO system 100. The circuits 300, 400 are further designed to be integrated into refuse trucks 10 having different battery 23 types or systems so that the E-PTO system 100 can be incorporated into the vehicle. The circuits 300, 400 further allow a user to lock out and disable the E-PTO system 100 without affecting the rest of the refuse truck 10 functions, so that the refuse truck 10 can still be driven or otherwise operated independent of the E-PTO system 100 function. This operational mode can be useful when power conservation is necessary, such as when the batteries 23 have limited remaining power.

The controller 316 can initiate electrical power transfer between the batteries 23 and the E-PTO system 100. In some examples, the controller 316 monitors the position of the disconnect 200. For example, the controller 316 can receive information from one or more of the disconnect feedback lines 330, 332 to determine whether the disconnect 200 is in the open or closed position. If the controller 316 determines that the disconnect 200 is open, the controller 316 can issue a command to open the contactor switch within the negative high voltage contactor 308. The auxiliary low voltage source 310 can then toggle the contactor switch open. In some examples, the controller 316 also communicates with the battery 23 and associated circuit to open contactors associated with the battery 23 to further isolate the battery 23 from the E-PTO system 100. Similarly, the controller 316 can control the electric power control box 202 so that the contactor switch within the negative high voltage contactor 308 closes whenever the controller 316 determines that the disconnect 200 is closed.

The controller 316 communicates with the battery 23 (e.g., to a power distribution unit (PDU) of the chassis 12 in communication with the battery 23) to initiate the transmission of electrical power from the battery 23 to and through the electric power control box 202. In some examples, the controller 316 communicates a detected voltage at the inverter 318, which can indicate whether or not the disconnect 200 is open or closed. If the contactor switch within the negative high voltage contactor 308 is open, the controller 316 can communicate with the battery 23 to ensure that the contactor switches associated with the battery 23 are open as well. Accordingly, no high voltage will be provided from the battery 23 to the electric power control box 202. If the controller 316 requests the contactors within the PDU of the battery 23 to open, but confirmation that the contactors are open is not received by the controller 316, the controller 316 will prevent the negative high voltage contactor 308 and associated switch from closing. Closing the negative high voltage contactor 308 before pre-charging the negative high voltage high voltage contactor 308 could couple the battery 23 to the electric power control box 202 in a way that might otherwise cause an inrush current that could weld the contactors or even blow a main fuse within the inverter 318. Accordingly, this condition is preferably avoided by the controller 316 and the electric power control box 202, more generally.

Similarly, the controller 316 communicates with the battery 23 to indicate that the battery 23 can be joined with the E-PTO system 100 through the inverter 318 and the electric power control box 202. The controller 316 monitors the status of the electric power control box 202. Upon detecting that the disconnect 200 has been closed and receiving confirmation that the contactors within the battery 23 (e.g., the PDU) are open, the controller 316 closes the contactor within the negative high voltage contactor 308. The controller 316 then initiates a pre-charging process to provide an initial voltage on each of the high voltage input 302 and high voltage output 322. In some examples, the controller 316 controls the switch 406 to close, thereby closing the pre-charge circuit 402 and providing an initial voltage onto the high voltage input 302 and high voltage output 322. In some examples, the pre-charge circuit operates in conjunction with the auxiliary low voltage source 310, which can pass an initial charge at a lower voltage through to the inverter 318 to charge the capacitive elements within the inverter 318. Once the controller 316 detects that an appropriate pre-charge level has been reached within inverter 318 and along the high voltage input 302 and high voltage output 322, the controller 316 opens the switch 406 and closes the contactor switch within the negative high voltage contactor 308. The controller 316 then sends instructions to the battery 23 or PDU to open the battery contactor switches, thereby providing electrical power from the battery 23 to the E-PTO system. In some examples, the battery 23 and PDU include a pre-charge circuit 400, such that the pre-charging operation can be left to the battery 23.

Figure 16:
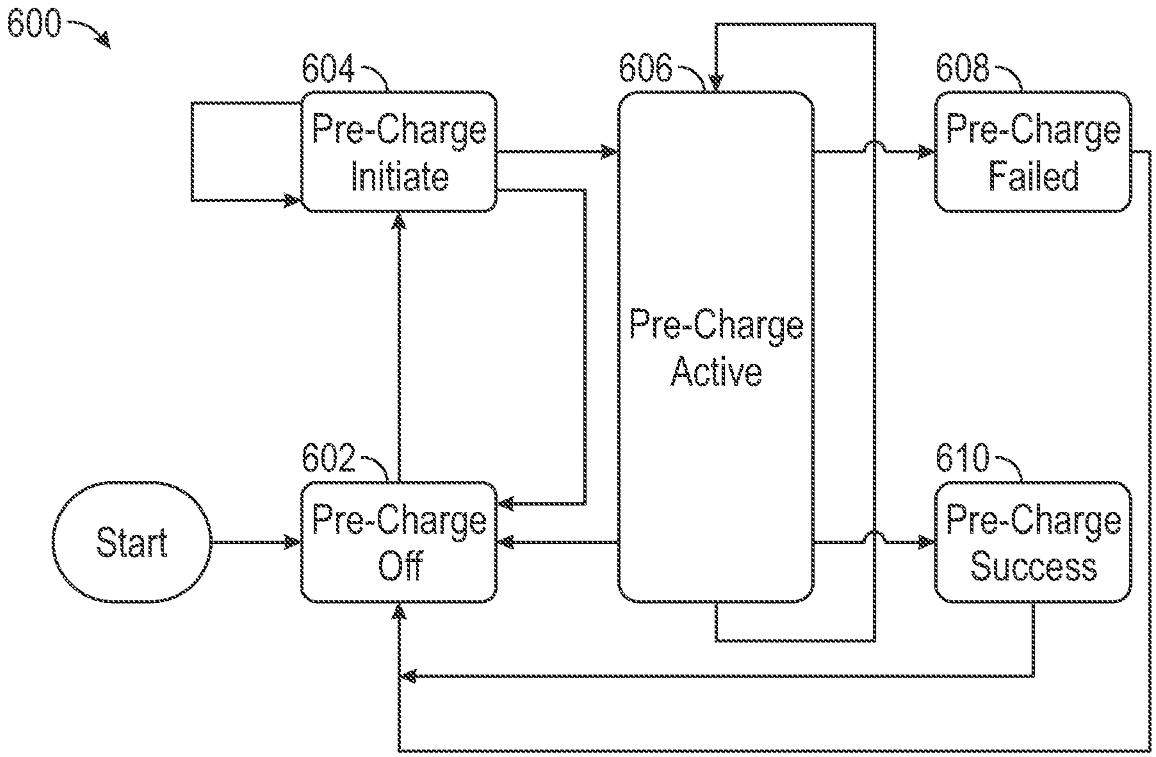
FIG. 16 is a flow chart depicting a method of operating a pre-charge circuit depicted in FIG. 10.
Figure 17:
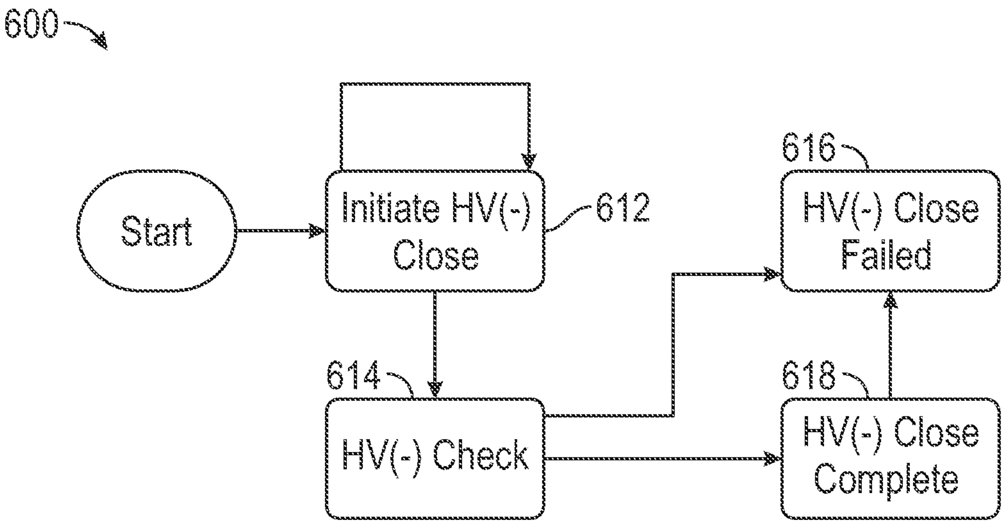
FIG. 17 is a flow chart depicting a method of operating the manual disconnect after performing a pre-charge operation using the method of FIG. 12.

Referring now to FIGS. 16-17, a method 600 of operating the pre-charge circuit 402 within the disconnect 200 is depicted. The method 600 can be performed by the controller 316, for example. The method 600 begins at step 602, where the ignition to the refuse truck 10 is off and the ignition to the refuse truck 10 has been off for a specified time period. In some examples, the specified time period for the refuse truck 10 to be "off" is about thirty seconds or more. Similarly, at step 602, the pre-charge circuit 402 is deactivated, such that no pre-charge is being provided.

At step 604, the ignition to the refuse truck 10 is turned on. Accordingly, at step 604, the ignition is on and the ignition to the refuse truck 10 has no longer been off for a specified time period. The pre-charge circuit 402 is then charged for a set time interval, so as to fully energize the pre-charge circuit 402. In some examples, the time allowed for the pre-charge circuit 402 to energize (i.e., the "pre-charge delay") is approximately 2 seconds. At step 604, the controller 316 continues to evaluate whether the pre-charge delay has elapsed, and remains at step 604 until the full pre-charge delay has occurred or the ignition is turned off. If the ignition is turned off, the method returns to step 602.

If the ignition remains on and the pre-charge delay has elapsed, the controller 316 advances to step 606. If the disconnect 200 is in the closed position and the negative high voltage contactor 308 is open, a pre-charge timer is set to 0. A pre-charge output is turned on and the pre-charge circuit is fully activated. The controller 316 continues to monitor a status of the pre-charge circuit 402 at step 606 to ensure that appropriate electrical properties are observed. If the ignition is turned off, the disconnect 200 is opened during this step, or the pre-charge timer exceeds a maximum allotted time (e.g., exceeds a timeframe of 10 seconds, for example), the controller 316 deactivates the pre-charge circuit and returns to step 602.

If the controller 316 determines that the pre-charge timer exceeds the maximum allotted time or the pre-charge output is turned off at step 606 before completing the pre-charging process, the controller 316 proceeds to step 608, and issues a failure signal. The failure signal can take a variety of forms, and can prevent the battery 23 from being coupled with the E-PTO system 100. In some examples, the controller 316 can issue an alert to a user within the cab 18 that the E-PTO system 100 cannot be coupled with the battery 23. In still other examples, an alarm within the cab 18 is triggered. The controller 316 then returns to step 602.

If the controller 316 continues to observe the pre-charge circuit 402 operating at step 606, the controller 316 will continue to update the pre-charge timer. Once the components within the pre-charge circuit 402 reach a certain charge level, the pre-charge process is considered successful at step 610. For example, in some embodiments, the controller 316 monitors a voltage of the inverter 318. When the inverter 318 reaches a target voltage (e.g., about 550 Volts), and holds that voltage for a specified time period (e.g., 1 second), the pre-charge process is complete, and the E-PTO system 100 is ready to join the battery 23. If, alternatively, the ignition is turned off or the pre-charge output is discontinued at step 610, the method returns to step 602, and the pre-charge circuit is disconnected or otherwise discharged.

If the pre-charging process at step 610 proves successful, the method 600 advances to step 612, shown in FIG. 17. At step 612, the controller 316 begins to initiate the closing process for the negative high voltage contactor 308 to complete the circuit and couple the E-PTO system 100 with the battery 23. As the method advances to step 612, the ignition is on, the access door 206 to the electric power control box 202 is closed, and the disconnect 200 is in the closed position. At step 612, the controller 316 monitors a negative high voltage contactor timer, and counts down incrementally as the voltage within the pre-charge circuit is supplied to the negative high voltage contactor. In some examples, the negative high voltage contactor timer is initially set to 500 milliseconds, for example. Once the negative high voltage contactor timer reaches 0 (meaning pre-charge has been sufficiently supplied), the controller performs a negative high voltage contactor check at step 614.

If, at step 614, the controller 316 determines that the negative high voltage contactor 308 is still open, the method advances to step 616, where the negative high voltage contactor 308 closing process fails. The controller 316 determines the process has failed and can issue an alert or warning that the coupling process has not been completed. In some examples, the negative high voltage contactor 308 output switch is opened as well upon detecting a failure.

If the controller 316 instead determines that the negative high voltage contactor 308 is closed (e.g., by receiving a digital signal, for example), the method advances to step 618. The controller then commands the pre-charge circuit 402 to power down and communication between the battery 23 and E-PTO system 100 is completed. In some examples, the controller 316 continues to monitor the negative high voltage contactor 308 after coupling has been completed, as if the contactor opens, the process will fail and the method will proceed to step 616. Additionally, the method 600 will return to step 602 at any time during steps 612-618 if the access door 206 of the electric power control box 202 is opened, the manual disconnect 200 is moved to the open position, the negative high voltage contactor 308 is opened, or a motor on command is canceled. If such situations are detected, the negative high voltage contactor 308 will be disconnected such that no electrical power will be transmitted from the battery 23 and the negative high voltage contactor 308. In some examples, the controller 316 further monitors a negative high voltage contactor 308 enable signal, which is monitored during steps 612-618 of the method 600.

Using the previously described systems and methods, a refuse truck can be effectively outfitted with an E-PTO system that can convert electrical power to hydraulic power to provide pressurized hydraulic fluid to various subsystems on the vehicle. The E-PTO system includes a disconnect that allows the E-PTO system to be decoupled from the battery of the refuse truck so that the vehicle can be operated in a low power mode that allows the vehicle to drive while the lifting system, compactor, and/or other hydraulic systems are disabled. The disconnect can lock out the E-PTO system so that the E-PTO system is disconnected from any electrical power sources that might otherwise cause the inverter, electrical motor, or hydraulic pump to operate during a maintenance procedure. The disconnect can be a manual switch that can be readily accessed by a user to couple or decouple the E-PTO system from the battery of the vehicle.

Figure 18:
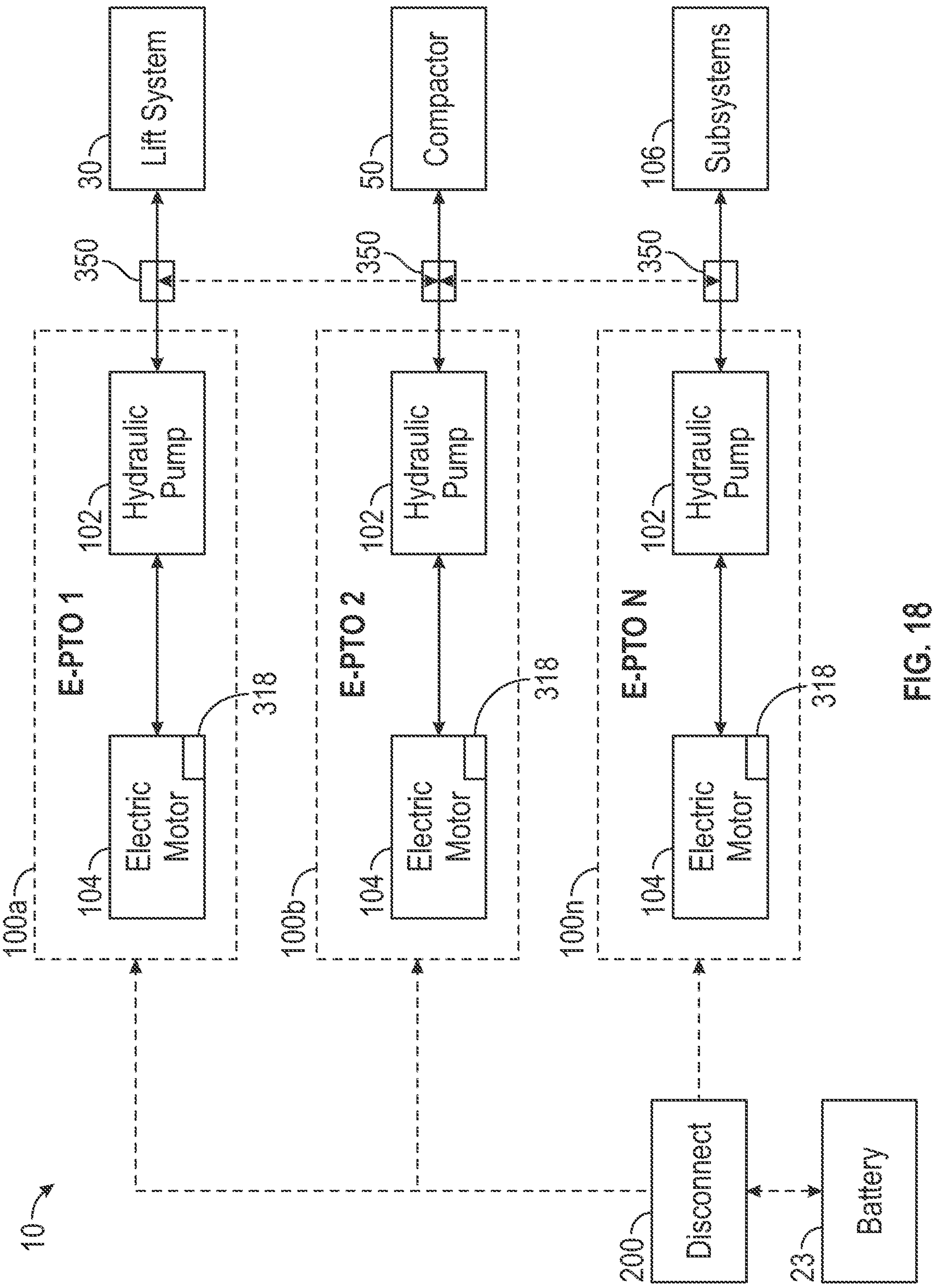
FIG. 18 is a schematic view of another control system that can be incorporated into any of the refuse vehicles of FIGS. 1-3.
Figure 19:
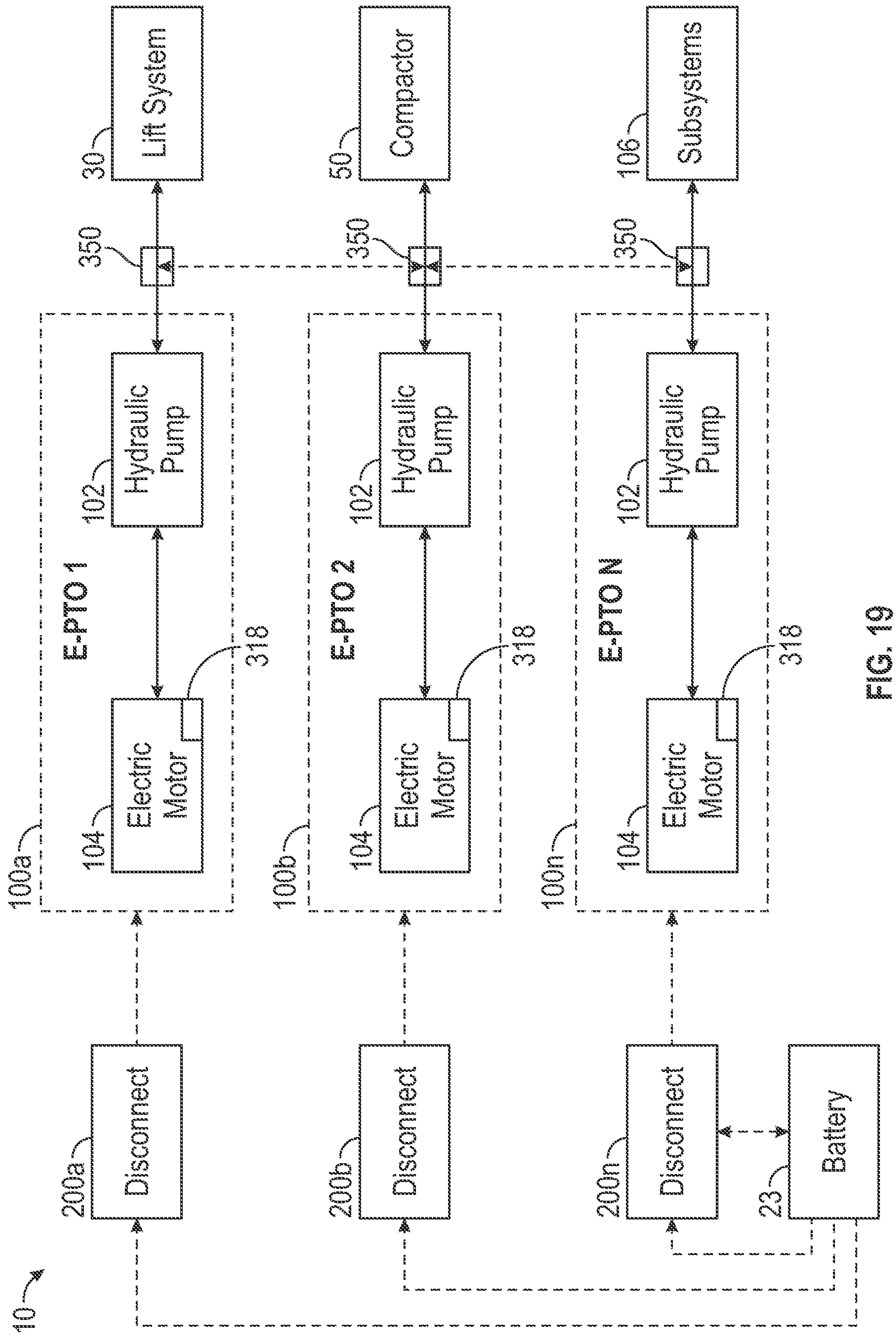
FIG. 19 is a schematic view of another control system that can be incorporated into any of the refuse vehicles of FIGS. 1-3.

With reference to FIGS. 18-19, additional alternative arrangements for the refuse vehicle 10 are provided. As depicted in each example, the refuse vehicle 10 can include multiple E-PTOs 100*a*, 100*b*, 100*n* such that the truck includes several distinct hydraulic circuits that are independently operable to control one of the lift system 30, compactor 50, and/or subsystems 106. For example, a distinct and separate E-PTO 100*a* can be provided for the lift system 30, while an independently operable E-PTO 100*b* is provided for the compactor 50. Separate hydraulic fluid reservoirs can be provided for each separate hydraulic circuit. The additional E-PTOs can help provide a more controllable and easier-to-maintain refuse vehicle 10.

Referring to FIG. 18, a schematic of an alternative refuse vehicle 10 is provided. The refuse vehicle 10 generally includes a charge storing device, shown as battery assembly 23, which is configured to provide power to the prime mover 20 to drive the refuse vehicle. The battery assembly 23 is further configured to provide power to one or more E-PTOs 100*a*, 100*b*, 100*n*. The E-PTOs 100*a*, 100*b*, 100*n*, as discussed above, each include an electric motor 104 that is configured to drive one or more hydraulic pumps 102 to provide pressurized hydraulic fluid to different systems on the refuse vehicle 10.

The electric motors 104 present within each E-PTO 100*a*, 100*b*, 100*n* are configured to draw electricity from the battery assembly 23. As depicted in FIG. 18, each E-PTO 100*a*, 100*b*, 100*n* can include an inverter 318 to convert DC electrical power received from the battery assembly 23 into AC electric power for use by the electric motor 104. The electric motor 104 can be an AC induction or permanent magnet-style AC motor that can be controlled using a variable frequency drive (VFD). In some examples, the VFD is included within the inverter 318. The VFD can then be used to control a speed of the electric motor 104, which in turn controls an output of the hydraulic pump 102 that is coupled with the electric motor 104.

As depicted, the first E-PTO 100*a* is configured to supply pressurized hydraulic fluid to control the lift system 30. Accordingly, the electric motor 104 and hydraulic pump 102 can each be better optimized to meet the hydraulic power requirements of the lift system, as less overall hydraulic power is needed (in comparison to a single hydraulic pump providing hydraulic power to the entire refuse vehicle 10). The cost and complexity of electric motors 104 and hydraulic pumps 102 increases significantly as the size of these components increases, such that providing a hydraulically-independent E-PTO 100*a* specifically for the lift system 30 can result in significant cost savings for the refuse truck 10. In some examples, multiple hydraulic pumps 102 can be driven by a common electric motor 104 via a dual shaft or transmission arrangement.

Similarly, the second E-PTO 100*b* is configured to supply pressurized hydraulic fluid to control the operation of the compactor 50 onboard the refuse vehicle 10. As depicted in FIG. 18, the second E-PTO 100*b* includes its own dedicated electric motor 104 and hydraulic pump 102 that are configured to receive electric power from the battery assembly 23 and convert the received electric power into hydraulic power for use within the compactor 50. In some examples, the first E-PTO 100*a* and second E-PTO 100*b* operate fluidly independent of one another, such that a malfunction or deactivation within the electric motor 104 within the second E-PTO 100*b* will not impact or otherwise affect the operation of the electric motor 104 within the first E-PTO 100*a*. In other examples, the first E-PTO 100*a* and second E-PTO 100*b* can be selectively fluidly independent of one another. For example, valving (e.g., one or more solenoid valves 350) within the refuse vehicle 10 can selectively couple the hydraulic pump 102 of the second E-PTO 100*b* into fluid communication with the hydraulic circuit associated with the lift system 30. Accordingly, if the electric motor 104 or hydraulic pump 102 of the first E-PTO 100*a* experience issues, the second E-PTO 100*b* can be fluidly coupled with the lift system 30, such that operation of the lift system 30 can continue. In some examples, the second E-PTO 100*b* can be configured to supply hydraulic power to each of the lift system 30 and the compactor 50 simultaneously. In other embodiments, the second E-PTO 100*b* may first be fluidly decoupled from the compactor 50 before coupling the second E-PTO 100*b* with the lift system 30. As explained in additional detail below, each of the E-PTOs 100*a*, 100*b*, 100*n* may be selectively fluidly coupled with any of the lift system 30, compactor 50, or subsystems 106 in some embodiments, depending on the arrangement and positioning of the valves 350.

In some examples, additional E-PTOs 100*n* can be included within the system to provide hydraulic power to additional subsystems 106 within the refuse vehicle 10. For example, and as explained above, the additional subsystems 106 can include hydraulics used to operate the tailgate 26, hydraulics used to operate a roof panel, hydraulics used to operate the top door 36, hydraulics used for power steering or other vehicle controls, or other hydraulically-powered systems on a refuse vehicle 10. The various different subsystems 106 can be supplied with hydraulic power from the electric motor 104 and hydraulic pump 102 of one or more E-PTOs 100*n*. The electric motor 104 is once again supplied with electrical power from the battery assembly 23, which can be first routed through the inverter 318 and/or VFD within the inverter 318 to convert the electrical power stored within the battery assembly 23 into AC electrical power for use within the electric motor 104.

Each of the E-PTOs 100*a*, 100*b*, 100*n* can be configured to convert electrical power received from the battery assembly 23 into hydraulic power that can be used to operate the various hydraulic cylinders and other hydraulics present aboard the refuse vehicle 10. Because each of these E-PTOs 100*a*, 100*b*, 100*n* operates using electrical power received from the battery assembly 23, a single disconnect 200 can be used to selectively electrically connect each of the E-PTOs 100*a*, 100*b*, 100*n* to the battery assembly 23 and to a power source on the vehicle frame 12. As explained above, the disconnect 200 can be operated manually to decouple each of the E-PTOs 100*a*, 100*b*, 100*n* from the battery assembly 23. The inclusion of a disconnect 200, as discussed above, can be helpful in maintenance situations where lockout/tag out procedures are being used. Similarly, the inclusion of a disconnect 200 can be helpful in reducing the power consumption of the body assembly 14 when the battery assembly 23 is operating in a low or reduced power state.

Referring to FIG. 19, another arrangement for the refuse vehicle 10 is provided. The refuse vehicle 10 is arranged similar to the refuse vehicle 10 depicted in FIG. 18, but includes a separate and dedicated disconnect 200*a*, 200*b*, 200*n* for each E-PTO 100*a*, 100*b*, 100*n*. The disconnects 200*a*, 200*b*, 200*n* can be associated with the E-PTOs 100*a*, 100*b*, 100*n* such that individual hydraulic systems aboard the refuse vehicle 10 can be selectively decoupled from the battery assembly 23 for maintenance or lower power operation. For example, if the battery assembly 23 is in a lower power setting, an operator could use the disconnect 200*b* to electrically decouple the second E-PTO 100*b* from the battery assembly 23, so as to cease operation of the compactor 50. This may be advantageous in lower power situations, as the compactor 50 can often require the greatest forces to operate, which in turn creates the largest electrical power draw from the battery assembly 23. Using the disconnect 200*b* to decouple the second E-PTO 100*b* from the battery assembly 23 can help to save energy in situations where a final set of stops are being performed before completing the route, where operation of the compactor 50 is not critical. The inclusion of multiple disconnects 200*a*, 200*b*, 200*n* can also facilitate maintenance procedures, as less equipment needs to be taken offline to service specific components.

Including multiple E-PTOs 100*a*, 100*b*, 100*n* on a single refuse vehicle 10 can provide a number of advantages, as explained above. For example, providing each hydraulic component with its own dedicated electric motor 104 and hydraulic pump 102 can allow the use of smaller and less expensive motors and pumps, which can reduce the overall cost of the refuse vehicle 10, while also making the refuse vehicle 10 easier to maintain. Further, the use of independent hydraulic circuits can allow for more precise control of the hydraulic pump 102, as fewer components are being provided with pressurized hydraulic fluid from the same source.

As explained above, the multiple E-PTOs 100*a*, 100*b*, 100*n* can be arranged to operate completely independent of one another or can be selectively fluidly coupled together using the valves 350. In some examples, the valves 350 are solenoid-operated valves that are in communication with the controller 316. The controller 316 can then monitor operation of the various E-PTOs 100*a*, 100*b*, 100*n* and can selectively create fluid communication between different hydraulic circuits on the refuse vehicle 10 in response to detecting certain events occurring within the refuse vehicle 10. For example, if the controller 316 receives an indication that the electric motor 104 within the second E-PTO 100*b* is malfunctioning or damaged, the controller 316 can open one or more of the valves 350 to provide pressurized hydraulic fluid to the compactor 50 from the first E-PTO 100*a* or an additional E-PTO 100*n*. Because multi-position valves 350 are provided between each of the E-PTOs 100*a*, 100*b*, 100*n* and their associated loads, the refuse vehicle 10 can react to failure conditions occurring on the refuse vehicle 10 in real-time to maintain the performance of the refuse vehicle 10. In normal operation, however, each of the E-PTOs 100*a*, 100*b*, 100*n* operate independently. Additionally, the inclusion of separate and distinct disconnects 200*a*, 200*b*, 200*n* for each E-PTO 100*a*, 100*b*, 100*n* allows for subsets of electrical equipment to be decoupled from the main battery assembly 23 without sacrificing the overall functionality of the refuse vehicle 10. This functionality can allow the overall refuse vehicle 10 to react and adapt to malfunctions within equipment in near-real time. In some examples, the controller 316 is configured to communicate an alarm and instructions to an operator to manually adjust a position of the disconnect 200 in response to detecting a failure within one of the E-PTOs 100*a*, 100*b*, 100*n*. Accordingly, damaged equipment can be readily taken offline and further damage to the equipment can be avoided, reducing the number of costly repairs.

Although the description of the E-PTO system and disconnect have been described within the context of a front end loading refuse truck, the same or similar systems can also be included in both side loading and rear end loading refuse trucks without significant modification. Accordingly, the disclosure should be considered to encompass the E-PTO system and disconnect in isolation and incorporated into any type or variation of refuse vehicle.

Additionally, the manual disconnect 200 discussed herein can be incorporated to selectively permit or block power transfer between systems other than the battery 23 and the E-PTO system 100. For example, and as depicted in FIG. 19, a disconnect 200 can be incorporated into a front-end loader (FEL) carry can 500. In some examples, the carry can 500 is configured to draw electrical power from the battery 23 using a wired connection or other coupling that creates electrical communication between the battery 23 and the carry can 500. The electricity supplied from the battery 23 to the carry can 500 can be used to operate the various lifting systems and other subsystems that may be present on the carry can 500. The disconnect 200 can selectively control and influence electrical communication that may otherwise occur through the forks 34 and the carry can 500 or through other wired connections that may normally couple the carry can 500 with the battery 23. The disconnect 200 may be positioned on either of the refuse truck 10 or on the carry can 500 in a location that permits manual actuation. In some examples, the carry can 500 includes its own onboard energy storage device 502 (e.g., a battery 502) that can be used to operate the carry can 500 when the carry can is disconnected from the battery 23 using the disconnect 200. Accordingly, the carry can 500 can continue to operate for a period of time even when no power from the primary battery 23 is being provided. In still other examples, the carry can 500 includes a controller 504 that is configured to detect a status of the two or more power sources coupled with the carry can 500 and power the carry can based upon which power supplies are currently providing power or currently able to provide power to the carry can 500. If electrical power from the battery 23 is available (e.g., the disconnect 200 is not tripped, the battery 23 has available power, etc.) the controller 504 will power the carry can 500 using electrical power from the battery 23. If the disconnect 200 is tripped and the connection between the battery 23 and the carry can 500 is disrupted (or if the battery 23 is in a lower power condition, etc.), the controller 504 will request power from the onboard energy storage device 502. In some examples, the disconnect 200 and/or controller 504 can supply electrical power from the onboard power supply 502 to the refuse vehicle 10 and/or the E-PTO system 100 if the battery 23 experiences unexpected failure or is in a low power condition. The disconnect 200 can selectively permit the transfer of electrical power from the carry can 500 to one or both of the battery 23 and the E-PTO system 100 to help drive the vehicle 10.

Figure 20:
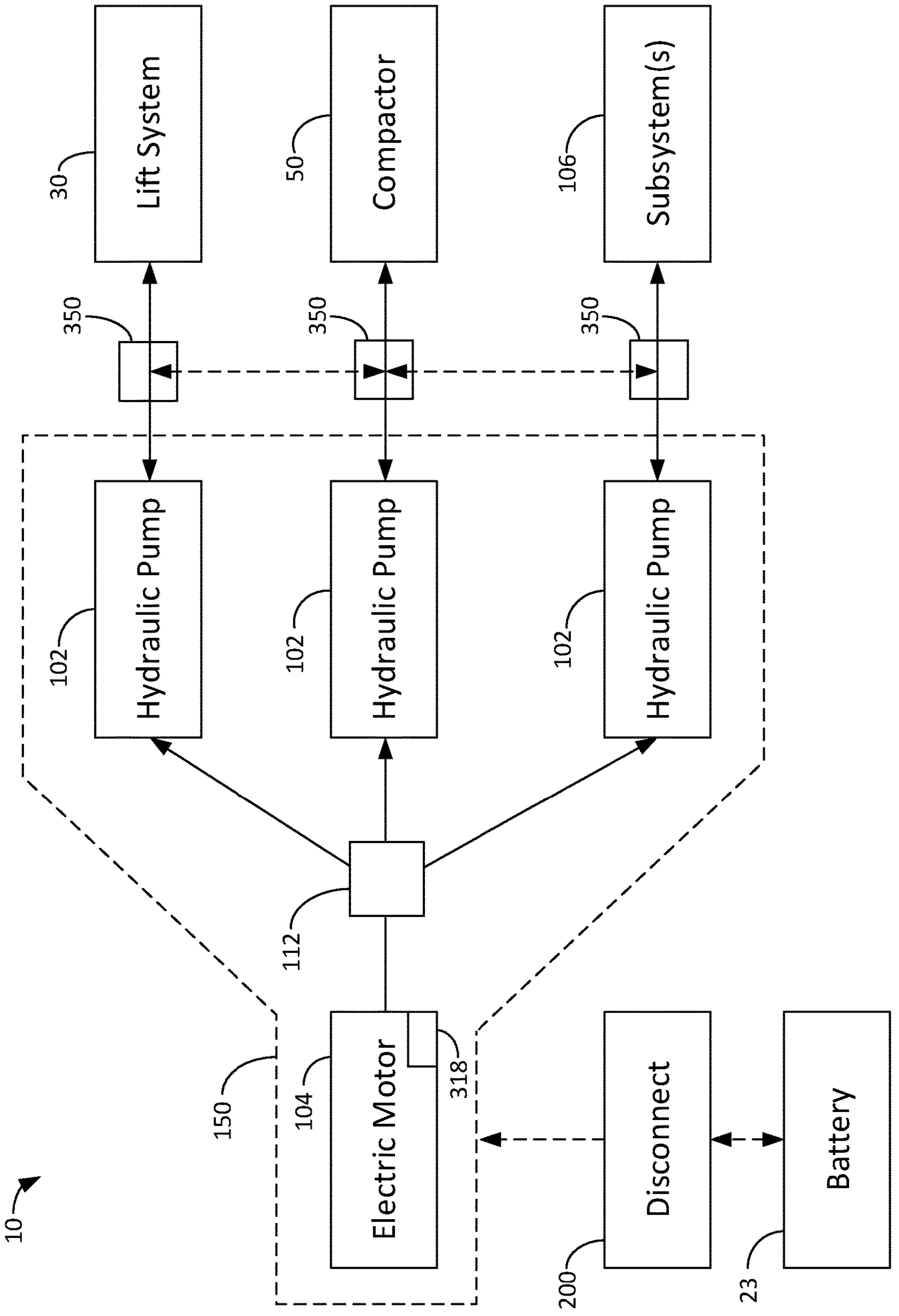
FIG. 20 is a schematic view of another control system that can be incorporated into any of the refuse vehicles of FIGS. 1-3.

Referring to FIG. 20, a schematic of an alternative refuse vehicle 10 is provided. The refuse vehicle 10 generally includes a charge storing device, shown as battery assembly 23, which may be configured to provide power to the prime mover 20 to drive the refuse vehicle. Alternatively, the battery assembly 23 may be dedicated to one or more hydraulic systems a different battery may be configured to provide power to the prime mover 20. The battery assembly 23 is configured to provide power to the E-PTO system 150. The E-PTO system 150 may share one or more features with any of the other E-PTOs discussed herein (e.g., E-PTO 100 100*a*, 100*b*, 100*n* etc.). The E-PTO system 150 includes an electric motor 104 that is configured to drive one or more hydraulic pumps 102 to provide pressurized hydraulic fluid to different systems on the refuse vehicle 10.

The electric motor 104 is configured to draw electricity (e.g., electrical power) from the battery assembly 23 and convert the electricity to mechanical power. As depicted in FIG. 20, the E-PTO system 150 includes an inverter 318 to convert DC electrical power received from the battery assembly 23 into AC electric power for use by the electric motor 104. The electric motor 104 can be an AC induction or permanent magnet-style AC motor that can be controlled using a variable frequency drive (VFD). In some examples, the VFD is included within the inverter 318. The VFD can then be used to control a speed of the electric motor 104, which in turn controls an output speed of one or more of the hydraulic pump 102 that are coupled with the electric motor 104.

As shown in FIG. 20, the electric motor 104 is coupled to a transmission arrangement 112 that is configured to transfer an output from the electric motor 104 to one or more of the hydraulic pumps 102. The transmission arrangement 112 may enable the electric motor 104 to individually power each of the hydraulic pumps 102. For example, each hydraulic pump 102 may provide hydraulic power (e.g., pressure, energy, etc.) to a different system of the refuse vehicle 10. In this sense, the electric motor 104 may provide power to just one hydraulic pump 102 (e.g., via the transmission arrangement 112) without powering the other two hydraulic pumps 102. For example, an operator of the refuse vehicle 10 may engage the lift system 30 without engaging the compactor 50 or the subsystems 106. In this example embodiment, the transmission arrangement 112 may engage the electric motor 104 with the respective hydraulic pump 102 while disengaging the electric motor 104 with the hydraulic pumps 102 that are not directly coupled to the compactor 50.

According to various embodiments, the transmission arrangement 112 may be configured to transfer an output from the electric motor 104 to two or more hydraulic pumps 102 simultaneously. For example, the transmission arrangement 112 may transfer mechanical power to all three hydraulic pumps 102. According to various embodiments, the amount of power transferred to the three hydraulic pumps 102 is the same. According to other embodiments, the amount of power transferred to the three hydraulic pumps 102 may be different. For example, the transmission arrangement 112 may transfer a first proportion of the output from the electric motor 104 to a first hydraulic pump 102, a second proportion of the output to a second hydraulic pump 102, and a third proportion to a third hydraulic pump 102. According to various embodiments, the first proportion, the second proportion, and the third proportion may be fixed proportions. For example, 60% of the output may be transferred to the hydraulic pump 102 associated with the lift system 30, 30% of the output may be transferred to the hydraulic pump 102 associated with the compactor 50, and the remaining 10% of the output may be transferred to the hydraulic pump 102 associated with the subsystems 106. Alternatively, the transmission arrangement 112 may be able to alter the first proportion, the second proportion, and the third proportion based on demand requirement from the lift system 30, the compactor 50, and/or the subsystems 106. Further, according to various embodiments, the transmission arrangement 112 may provide a minimum threshold output to each hydraulic pump 102. For example, the lift system 30, the compactor 50, and/or the subsystems 106 may be include hydraulics that configured to idle at a minimum pressure. In this example, the transmission arrangement 112 may be configured to transfer a sufficient output to each of the hydraulic pumps 102 to maintain the desired idle pressure. The transmission arrangement 112 may further be configured to increase the first proportion output while maintaining a minimum threshold output for the second proportion and the third proportion.

As depicted, the first hydraulic pump 102 is configured to supply pressurized hydraulic fluid to control the lift system 30. Accordingly, the electric motor 104, the transmission arrangement 112, and the first hydraulic pump 102 can each be better optimized to meet the hydraulic power requirements of the lift system, as less overall hydraulic power is needed (in comparison to a single hydraulic pump providing hydraulic power to the entire refuse vehicle 10). The cost and complexity of hydraulic pumps 102 increases significantly as the size of these components increases, such that providing a hydraulically-independent hydraulic pump 102 specifically for the lift system 30 can result in significant cost savings for the refuse truck 10.

Utilizing a single electric motor 104 to drive multiple hydraulic pumps, rather than each hydraulic pump 102 having a dedicated motor, may reduce manufacturing costs, reduce the weight of the vehicle, and improve the overall efficiency of the refuse vehicle 10. For example, having two independent electric motors 104 may cost more than a single independent electric motor 104 that is able to produce a similar output. Similarly, having two independent electric motors 104 may weigh more than a single independent electric motor 104 that is able to produce a similar output. Further, the refuse vehicle 10 may include a first inverter 318 configured to convert direct current electrical power received from the energy storage device 23 into alternating current to drive the motor 104. By utilizing a single motor 104, the E-PTO system may only require a single inverter 318, thereby reducing manufacturing costs.

Similarly, the second hydraulic pump 102 is configured to supply pressurized hydraulic fluid to control the operation of the compactor 50 onboard the refuse vehicle 10. As depicted in FIG. 20, the second hydraulic pump 102 is configured to receive mechanical power from the transmission arrangement 112 and convert the received mechanical power into hydraulic power for use within the compactor 50. In some examples, the first hydraulic pump 102 and second hydraulic pump 102 operate fluidly independent of one another, such that a malfunction or deactivation within the first hydraulic pump will not impact or otherwise impact the operation of the second hydraulic pump 102.

In other examples, the first hydraulic pump 102 and second hydraulic pump 102 can be selectively fluidly independent of one another. For example, valving (e.g., one or more solenoid valves 350) within the refuse vehicle 10 can selectively couple the second hydraulic pump 102 into fluid communication with the hydraulic circuit associated with the lift system 30. Accordingly, if the first hydraulic pump 102 experience deteriorated performance or other undesired issues, the second hydraulic pump 102 can be fluidly coupled with the lift system 30, such that operation of the lift system 30 can continue. In some examples, the second hydraulic pump 102 can be configured to supply hydraulic power to each of the lift system 30 and the compactor 50 simultaneously. In other embodiments, the second hydraulic pump 102 may first be fluidly decoupled from the compactor 50 before coupling the hydraulic circuit associated with the lift system 30. As explained in additional detail below, each of the hydraulic pumps 102 may be selectively fluidly coupled with any of the lift system 30, compactor 50, or subsystems 106 in some embodiments, depending on the arrangement and positioning of the valves 350.

In some examples, additional hydraulic pumps 102 (e.g., a third hydraulic pump, a fourth hydraulic pump, etc.) can be included within the system to provide hydraulic power to additional subsystems 106 within the refuse vehicle 10. For example, and as explained above, the additional subsystems 106 can include hydraulics used to operate the tailgate 26, hydraulics used to operate a roof panel, hydraulics used to operate the top door 36, hydraulics used for power steering or other vehicle controls, or other hydraulically-powered systems on a refuse vehicle 10. The various different subsystems 106 can be supplied with hydraulic power from the electric motor 104 and the third hydraulic pump 102. The electric motor 104 is once again supplied with electrical power from the battery assembly 23, which can be first routed through the inverter 318 and/or VFD within the inverter 318 to convert the electrical power stored within the battery assembly 23 into AC electrical power for use within the electric motor 104.

Each of the hydraulic pump 102 can be configured to convert electrical power received from the transmission arrangement 112 into hydraulic power that can be used to operate the various hydraulic cylinders and other hydraulics present aboard the refuse vehicle 10. Because each of these hydraulic pump 102 operates using mechanical power received from the transmission arrangement 112, which receives power from a single electric motor 104, a single disconnect 200 can be used to selectively electrically connect each of the hydraulic pumps 102 to the battery assembly 23. The inclusion of a disconnect 200, as discussed above, can be helpful in maintenance situations where lockout/tag out procedures are being used. Similarly, the inclusion of a disconnect 200 can be helpful in reducing the power consumption of the body assembly 14 when the battery assembly 23 is operating in a low or reduced power state.

Figure 21:
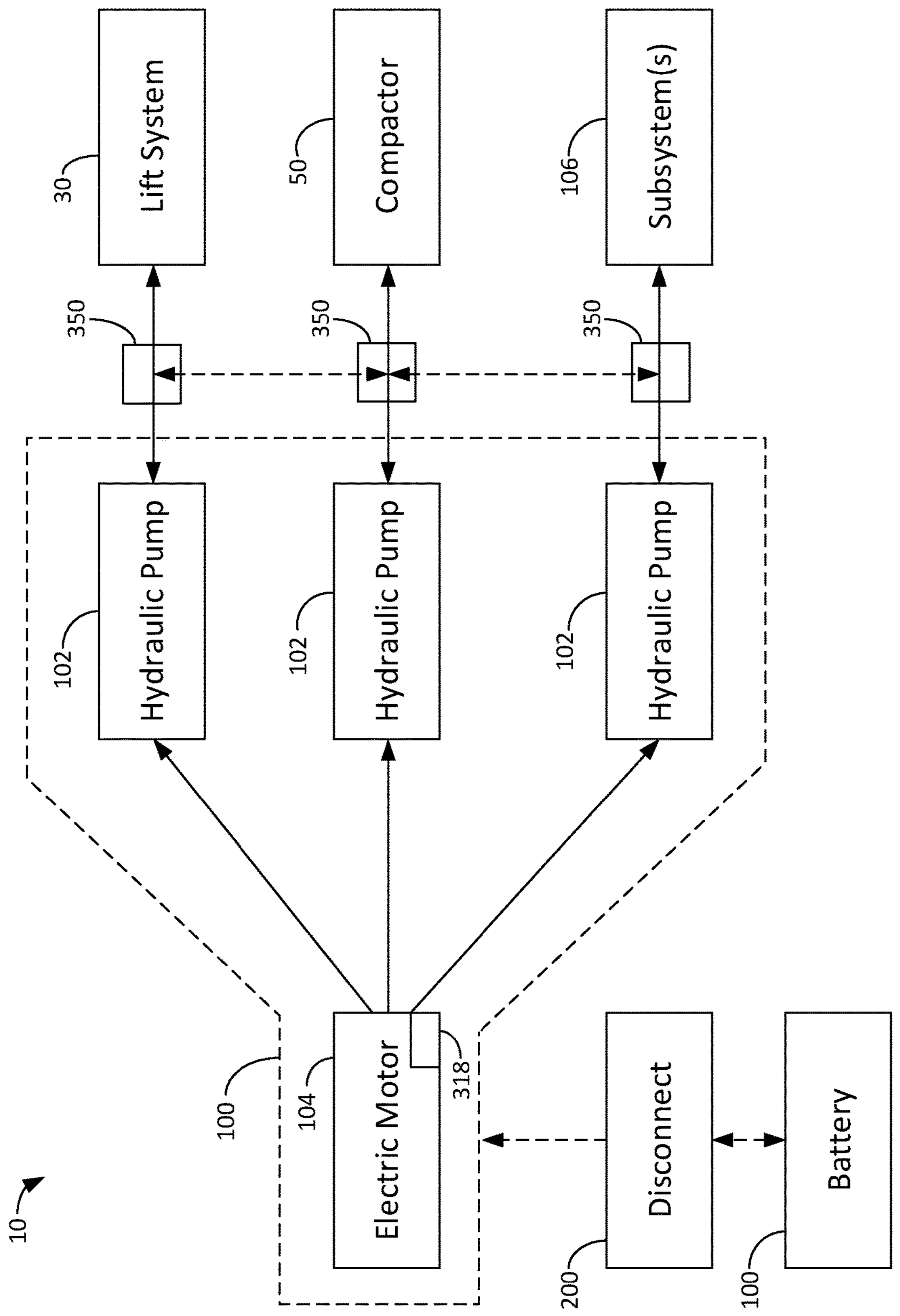
FIG. 21 is a schematic view of another control system that can be incorporated into any of the refuse vehicles of FIGS. 1-3.

Referring to FIG. 21, a schematic of an alternative refuse vehicle 10 is provided. The refuse vehicle 10 generally includes a charge storing device, shown as battery assembly 23, which may be configured to provide power to the prime mover 20 to drive the refuse vehicle. Alternatively, the battery assembly 23 may be dedicated to one or more hydraulic systems a different battery may be configured to provide power to the prime mover 20. The battery assembly 23 is configured to provide power to the E-PTO system 170. The E-PTO system 170 may share one or more features with any of the other E-PTOs discussed herein (e.g., E-PTO 100 100*a*, 100*b*, 100*n*, 150, etc.). The E-PTO system 170 includes an electric motor 104 that is configured to drive one or more hydraulic pumps 102 to provide pressurized hydraulic fluid to different systems on the refuse vehicle 10.

The electric motor 104 is configured to draw electricity (e.g., electrical power) from the battery assembly 23 and convert the electricity to mechanical power. As depicted in FIG. 21, the E-PTO system 150 includes an inverter 318 to convert DC electrical power received from the battery assembly 23 into AC electric power for use by the electric motor 104. The electric motor 104 can be an AC induction or permanent magnet-style AC motor that can be controlled using a variable frequency drive (VFD). In some examples, the VFD is included within the inverter 318. The VFD can then be used to control a speed of the electric motor 104, which in turn controls an output speed of one or more of the hydraulic pump 102 that are coupled with the electric motor 104.

As shown in FIG. 17, the electric motor 104 is independently coupled to each of the one or more of the hydraulic pumps 102 (e.g., via a plurality of output shafts). The electric motor 104 may be configured to individually power each of the hydraulic pumps 102. For example, each hydraulic pump 102 may provide hydraulic power (e.g., pressure, energy, etc.) to a different system of the refuse vehicle 10. In this sense, the electric motor 104 may provide power to just one hydraulic pump 102 (e.g., via the transmission arrangement 112) without powering the other two hydraulic pumps 102. For example, an operator of the refuse vehicle 10 may engage the lift system 30 without engaging the compactor 50 or the subsystems 106. In this example embodiment, the electric motor 104 may provide power to the respective hydraulic pump 102 associated with the lifting system while disengaging the hydraulic pumps 102 that are not directly coupled to the compactor 50.

According to various embodiments, the one or more output shafts are configured to output power from the electric motor 104 to two or more hydraulic pumps 102 simultaneously. For example, the one or more output shafts may transfer mechanical power to all three hydraulic pumps 102 (e.g., via three separate output shafts). According to various embodiments, the amount of power transferred to the three hydraulic pumps 102 is the same. According to other embodiments, the amount of power transferred to the three hydraulic pumps 102 may be different. For example, one or more output shafts may transfer a first proportion of the output from the electric motor 104 to a first hydraulic pump 102, a second proportion of the output to a second hydraulic pump 102, and a third proportion to a third hydraulic pump 102. According to various embodiments, the first proportion, the second proportion, and the third proportion may be fixed proportions. For example, 60% of the output may be transferred to the hydraulic pump 102 associated with the lift system 30, 30% of the output may be transferred to the hydraulic pump 102 associated with the compactor 50, and the remaining 10% of the output may be transferred to the hydraulic pump 102 associated with the subsystems 106. Alternatively, the one or more output shafts may be able to alter the first proportion, the second proportion, and the third proportion based on demand requirement from the lift system 30, the compactor 50, and/or the subsystems 106 (e.g., by altering a speed of the electric motor 104). Further, according to various embodiments, the one or more output shafts may provide a minimum threshold output to each hydraulic pump 102. For example, the lift system 30, the compactor 50, and/or the subsystems 106 may be include hydraulics that configured to idle at a minimum pressure. In this example, the one or more output shafts may be configured to transfer a sufficient output to each of the hydraulic pumps 102 to maintain the desired idle pressure. The one or more output shafts may further be configured to increase the first proportion output while maintaining a minimum threshold output for the second proportion and the third proportion.

As utilized herein, the terms “approximately”, “about”, “substantially”, and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term “exemplary” as used herein to describe various embodiments is intended to indicate that such embodiments are possible examples, representations, and/or illustrations of possible embodiments (and such term is not intended to connote that such embodiments are necessarily extraordinary or superlative examples).

The terms “coupled,” “connected,” and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., “top,” “bottom,” “above,” “below,” “between,” etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the refuse truck as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A refuse vehicle comprising:

a frame;

a chassis coupled to the frame and supporting a plurality of wheels;

a body coupled at least one of the frame and the chassis;

a battery coupled to at least one of the frame and the chassis and configured to provide electrical power to a first motor, wherein rotation of the first motor selectively drives at least one of the plurality of wheels;

a vehicle body supported by the chassis and defining a receptacle for storing refuse therein;

an electric power take-off system coupled to the vehicle body, the electric power take-off system including a second motor configured to convert electrical power received from the battery into hydraulic power;

one or more microphones coupled to the body and configured to detect noise;

one or more speakers coupled to the body configured to emit noise reducing sounds;

a controller configured to receive data related to the detected noise from the one or more microphones and cause the one or more speakers to emit the noise reducing sounds in response to the data received from the one or more microphones; and an electric power take-off housing at least partially surrounding the second motor, the electric power take-off housing comprising a layer of sound insulating material configured to reduce an audible output of the electric power take-off system.

2. The refuse vehicle of claim 1, further comprising one or more sensors configured to detect operating conditions of at least one of the first motor or the second motor and provide operating condition data to the controller, wherein the controller is configured to adjust the noise reducing sounds emitted by the one or more speakers in response to receiving the operating condition data.

3. The refuse vehicle of claim 2, wherein the operating condition data indicates at least one of a first speed of the first motor and a second speed of the second motor, wherein the controller is configured to increase an amount of noise reducing sounds emitted in response to detecting an increase in the at least one of the first speed and the second speed.

4. The refuse vehicle of claim 1, wherein at least one of the one or more speakers is coupled directly to the electric power take-off housing.

5. The refuse vehicle of claim 1, wherein the layer of sound insulating material is flame resistant.

6. A method of reducing an audible output from an electric vehicle, the method comprising:

providing a refuse vehicle including:

a first motor configured to drive at least one of a plurality of wheels;

a battery coupled to the first motor and configured to provide electrical power to the first motor; and an electric power take-off system including a second motor configured to convert electrical power received from the battery into hydraulic power;

detecting, by one or more microphones, noise generated by the refuse vehicle;

receiving, by a controller, noise data from the one or more microphones, wherein the noise data is indicative of the noise detected by the one or more microphones;

generating, by the controller, noise reducing control data in response to receiving the noise data from the one or more microphones;

providing, by the controller, the noise reducing control data to one or more speakers;

emitting, by the one or more speakers, noise reducing sounds in response to receiving the noise reducing control data; and providing an electric power take-off housing at least partially surrounding the second motor, the electric power take-off housing comprising a layer of sound insulating material configured to reduce the audible output of the electric power take-off system.

7. The method of claim 6, further comprising:

detecting, by one or more sensors, operating conditions of at least one of the first motor or the second motor;

receiving, by the controller, operating condition data indicative of the operating conditions from the one or more sensors; and adjusting, by the controller, the noise reducing sounds emitted by the one or more speakers in response to receiving the operating condition data.

8. The method of claim 7, wherein the operating condition data indicates at least one of a first speed of the first motor and a second speed of the second motor, and wherein the method further comprises increasing, by the controller, an amount of noise reducing sounds emitted from the one or more speakers in response to determining an increase in the first speed of the first motor or an increase in the second speed of the second motor.

9. The method of claim 6, wherein at least one of the one or more speakers is coupled directly to the electric power take-off housing.

10. A refuse vehicle of claim 1, comprising:

a chassis supporting a plurality of wheels;

a body coupled to the chassis and defining a receptacle for storing refuse therein;

a battery coupled to at least one of the chassis and the body and configured to provide electrical power to a first motor, wherein rotation of the first motor selectively drives at least one of the plurality of wheels;

an electric power take-off system coupled to at least one of the chassis and the body, the electric power take-off system including a second motor configured to convert electrical power received from the battery into hydraulic power;

one or more microphones coupled to the body and configured to detect noise;

one or more speakers coupled to the body configured to emit noise reducing sounds; and a controller configured to:

receive data related to the detected noise from the one or more microphones and cause the one or more speakers to emit the noise reducing sounds in response to the data received from the one or more microphones; and receive location data and estimate a location of the refuse vehicle based on the location data and reduce a speed of the second motor in response to estimating the location of the refuse vehicle is within a predefined geo-fenced area.

11. A method of reducing an audible output from an electric vehicle, the method comprising:

providing a refuse vehicle including:

a first motor configured to drive at least one of a plurality of wheels;

a battery coupled to the first motor and configured to provide electrical power to the first motor; and an electric power take-off system including a second motor configured to convert electrical power received from the battery into hydraulic power;

detecting, by one or more microphones, noise generated by the refuse vehicle;

receiving, by a controller, noise data from the one or more microphones, wherein the noise data is indicative of the noise detected by the one or more microphones;

generating, by the controller, noise reducing control data in response to receiving the noise data from the one or more microphones; and providing, by the controller, the noise reducing control data to one or more speakers;

emitting, by the one or more speakers, noise reducing sounds in response to receiving the noise reducing control data;

receiving, by the controller, location data;

estimating, by the controller, a location of the refuse vehicle based on the location data; and reducing, by the controller, a speed of the second motor in response to estimating the location of the refuse vehicle is within a predefined geo-fenced area.

* * * * *